United States Patent [19]

Yamaguchi et al.

[11] 4,115,533

[45] * Sep. 19, 1978

[54] PREPARATION OF SOLID TITANIUM TRICHLORIDE

[75] Inventors: Kazuo Yamaguchi, Fujisawa; Genjiro Kakogawa; Masayoshi Hasuo, both of Yokohama; Nobuaki Goko; Yasuo Maruyama, both of Kawasaki, all of Japan

[73] Assignee: Mitsubishi Chemical Industries, Ltd., Tokyo, Japan

[*] Notice: The portion of the term of this patent subsequent to Nov. 29, 1994, has been disclaimed.

[21] Appl. No.: 820,911

[22] Filed: Aug. 1, 1977

Related U.S. Application Data

[62] Division of Ser. No. 600,819, Jul. 31, 1975, Pat. No. 4,060,593.

[30] Foreign Application Priority Data

Jul. 31, 1974 [JP] Japan ............................... 49-88476
Jul. 31, 1974 [JP] Japan ............................... 49-88477

[51] Int. Cl.$^2$ ........................................... C01G 23/02
[52] U.S. Cl. .................................................. 423/492
[58] Field of Search .................. 423/492; 252/429 A, 252/442, 429 B, 429 C; 260/93.7, 94.9 B; 526/159

[56] References Cited

U.S. PATENT DOCUMENTS

| | | | |
|---|---|---|---|
| 3,492,281 | 1/1970 | Smith | 252/429 B |
| 3,681,256 | 8/1972 | Blunt | 260/94.9 B |
| 3,984,350 | 10/1976 | Karayannis et al. | 252/429 B |
| 4,007,133 | 2/1977 | Rust et al. | 252/429 B |
| 4,008,175 | 2/1977 | Rust et al. | 252/429 B |
| 4,060,593 | 11/1977 | Yamaguchi et al. | 423/492 |

FOREIGN PATENT DOCUMENTS

| | | | |
|---|---|---|---|
| 721,245 | 2/1973 | South Africa | 423/492 |
| 960,232 | 6/1964 | United Kingdom | 526/159 |

*Primary Examiner*—Brian Hearn
*Attorney, Agent, or Firm*—Lane, Aitken, Dunner & Ziems

[57] ABSTRACT

Solid titanium trichloride in the form of fine granules having low aluminum compound content, which is suitable as a catalyst for polymerization of α-olefins, especially, propylene is obtained as a precipitate by heating liquefied titanium trichloride in the presence of a liberating agent, and separating the thus formed precipitate. The liquified titanium trichloride is preferably prepared with an reducing titanium tetrachloride by organic aluminum compound in the presence of ether and hydrocarbon.

7 Claims, 4 Drawing Figures

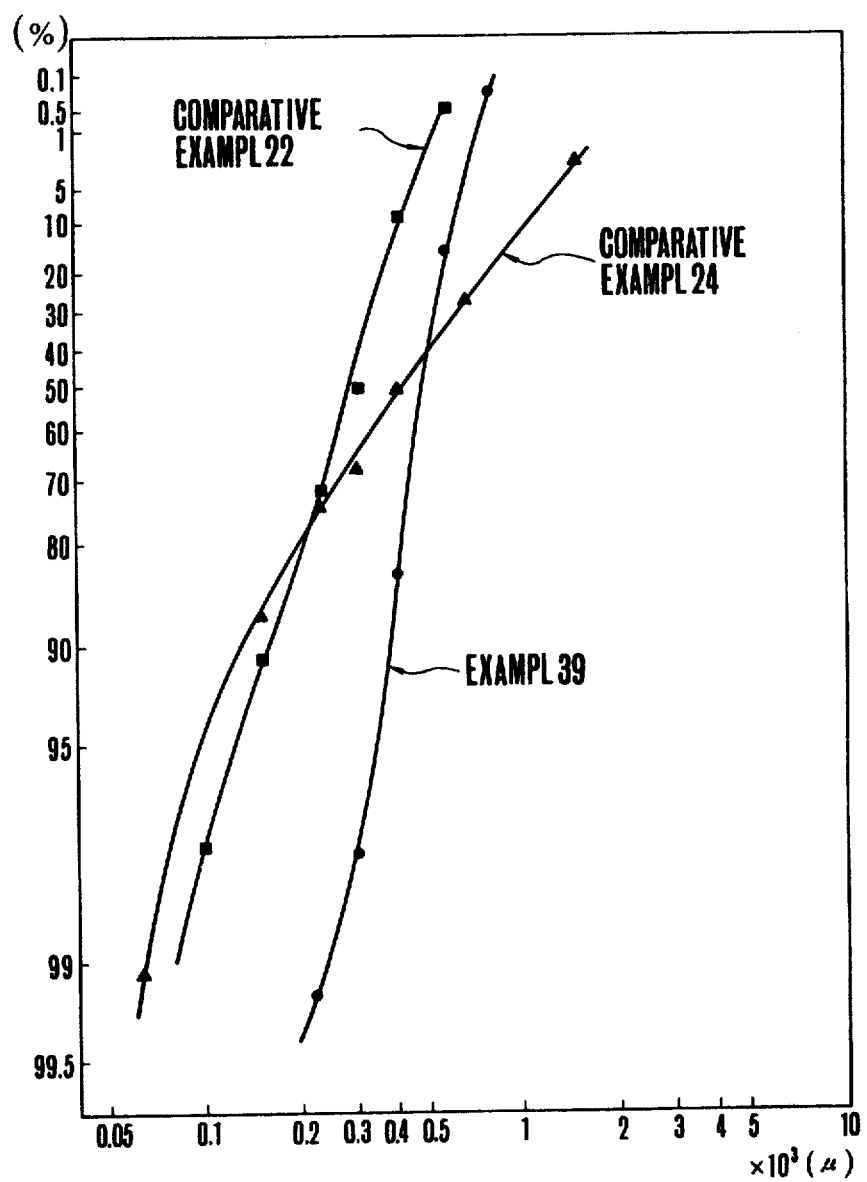

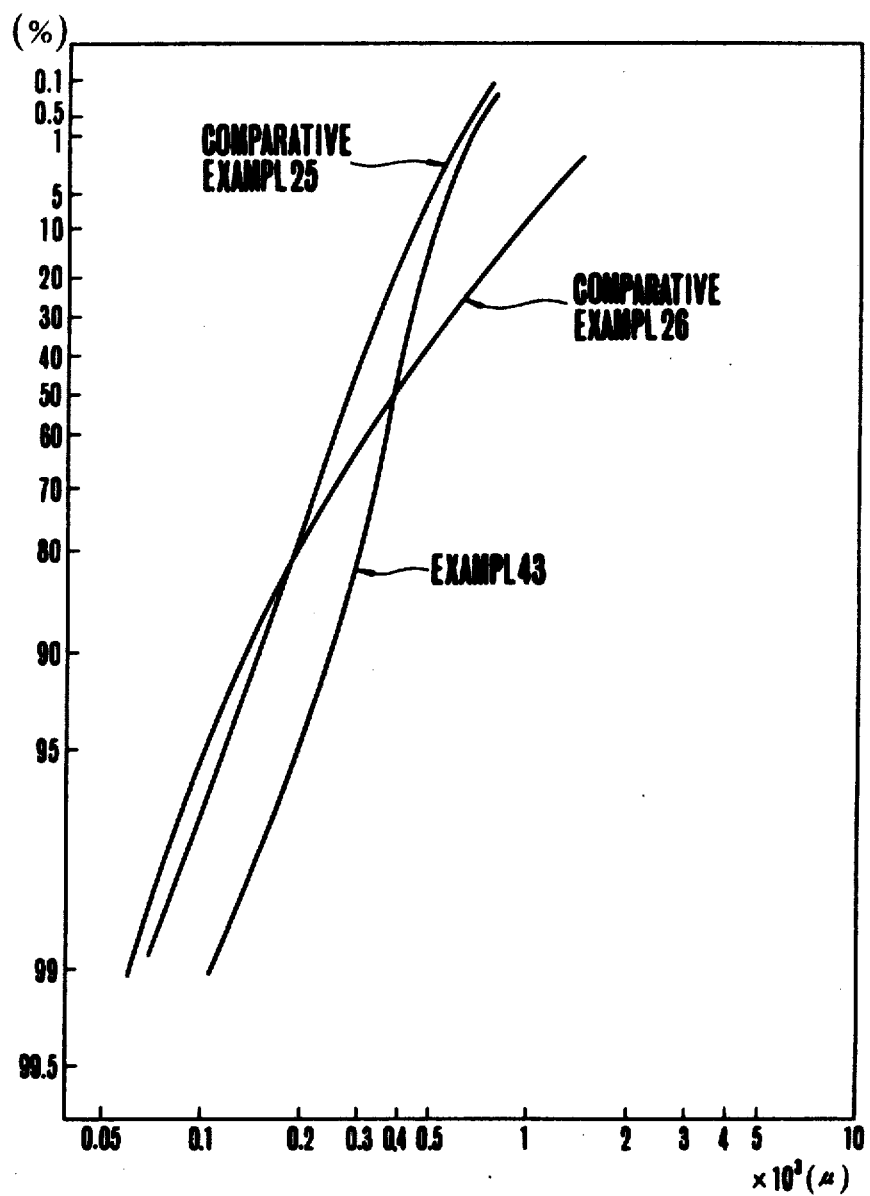

PREPARATION OF SOLID TITANIUM TRICHLORIDE

This is a division of application Ser. No. 600,819, filed July 31, 1975, U.S. Pat. No. 4,060,593, which in turn is a continuation-in-part of Ser. No. 598,425, filed July 23, 1975, and now abandoned.

FIELD OF THE INVENTION

This invention relates to a method for the manufacture of solid titanium trichloride suitable as a catalyst for the polymerization of $\alpha$-olefins, particularly ethylene, propylene, butene, etc. and more specifically to solid titanium trichloride in the form of fine granules having an extremely low aluminum compound content and suitable for use as a catalyst for the stereospecific polymerization of the $\alpha$-olefins.

DESCRIPTION OF THE PRIOR ART

Various methods have previously been suggested for the manufacture of solid titanium trichloride and solid eutectic crystals of titanium trichloride-aluminum trichloride which are used as polymerization catalysts for $\alpha$-olefins. One method obtains a solid $\alpha$-type titanium trichloride by reducing titanium tetrachloride with hydrogen gas at elevated temperature. Such $\alpha$-type titanium trichloride has insufficient catalytic activity for use as a polymerization catalyst for $\alpha$-olefins which, produces a polymer having a high amorphous polymer content and proves unsatisfactory in terms of stereospecific polymerization. In another method solid eutectic crystals of titanium trichloride and aluminum chloride are produced by reducing titanium tetrachloride with metallic aluminum at elevated temperatures. The titanium trichloride obtained by this method are known in the art as a $\gamma$-type or $\alpha$-type titanium trichloride. The solid eutectic crystals is used as a catalyst for polymerization, but exhibit deficient polymerization activity, are unsatisfactory in terms of stereospecific polymerization and produce a polymer having a high amorphous polymer content.

The titanium trichloride which is obtained by the reduction of titanium tetrachloride with an organometallic compound of aluminum is generally a brown solid titanium chloride and is known in it is desired to obtain a stereospecific art as belonging to the $\beta$-type. When the polymer, using this brown titanium trichloride as a catalyst, the generally adopted technique requires heating the brown titanium trichloride to a temperature of not less than 150° C for conversion into purple titanium trichloride. This purple titanium trichloride is also unsatisfactory for use as a catalyst for the polymerization of $\alpha$-olefins because it exhibits deficient polymerization activity, provides unsatisfactory stereospecific polymerization and produces a polymer having a high amorphous polymer content. Another technique for converting the solid $\beta$-type titanium trichloride into purple titanium trichloride by first treating it with a complexing agent and then heating the treated titanium trichloride in titanium tetrachloride has been suggested by the Solvay Company. In addition, a technique whereby the various types of titanium trichloride obtained by the various methods described above are treated with various complexing agents, a technique whereby they are pulverized in a ball mill in the presence or absence of a varying kind of complexing agent, and so on are also known in the art. Further, a method whereby solid titanium trichloride is obtained by reducing titanium tetrachloride with an organoaluminum compound in the presence of an electron-donating compound such as an ether is also known in the art. None of these methods known in the art, however, has been successful in producing titanium trichloride catalyst having high calytic activity in the polymerization of $\alpha$-olefins of high stereospecificity and good slurry properties.

BRIEF SUMMARY OF THE INVENTION

It is, therefore, an object of the present invention to provide a finely granulated solid titanium trichloride which exhibits high catalytic activity in the polymerization of $\alpha$-olefins.

Another object of the present invention is to provide a finely granulated solid titanium trichloride suitable as a polymerization catalyst for the production of a polymer having high stereospecificity.

A further object of the present invention is to provide a finely granulated solid titanium trichloride suitable as a polymerization catalyst for the production of a polymer exhibiting good slurry properties in the polymerization.

A still further object of the present invention is to provide a finely granulated solid titanium trichloride suitable as a polymerization catalyst for the production of $\alpha$-olefins having a uniform particle size distribution.

Yet another object of the present invention is to provide a finely granulated solid titanium trichloride suitable as a polymerization catalyst for the production of $\alpha$-olefins having a high bulk density.

Another significant object of the present invention is to provide a simplified process for the preparation of a finely granulated solid a titanium trichloride suitable as the polymerization catalyst for the production of $\alpha$-olefins having the desired properties described above.

Other objects of the present invention will become apparent from the following description of this invention.

This invention essentially comprises heating liquefied titanium trichloride, which is soluble in hydrocarbon solvents and obtained by the action of an ether, in the presence of a liberating agent selected from Lewis acids having stronger acidity than the titanium trichloride, at a temperature in the range of 20° – 150° C, thereby producing a finely granulated solid titanium trichloride

DETAILED DESCRIPTION OF THE INVENTION

To prepare the liquefied titanium trichloride in a form which is soluble in hydrocarbon solvents any of the methods which are broadly divided under the following two classes may be adopted:

(A) Methods wherein titanium tetrachloride is reduced with a specific organoaluminum compound, in the presence of an ether, or an ether and a suitable hydrocarbon solvent.

(B) Methods wherein solid titanium trichloride starting material is treated with an ether, if necessary, in the presence of a suitable hydrocarbon solvent.

The methods of tape (A) above, that is, the methods in which the titanium tetrachloride starting material is reduced with an organoaluminum compound in the presence of an ether or an ether and hydrocarbon solvents, is as follows:

The ether used in the process of the invention maybe any type of capable of forming liquefied titanium trichloride, preferably, the ether or others is selected from the group of ethers soluble in hydrocarbon solvents, for example, ethers represented by the generic formula;

$$R^1OR^2 \qquad (1)$$

wherein $R^1$ and $R^2$ independently represent an alkyl group, an aralkyl group, an alkenyl group, an aryl group or an alparyl group and may be same or different.

Specifically, these ethers include dialkyl ethers such as di-n-amyl ether, di-n-butyl, di-n-propyl ether, di-n-hexyl ether, di-n-heptyl ether, di-n-octyl ether, di-n-decyl ether, di-n-dodecyl ether, di-n-tridecyl ether, n-amyl-n-butyl ether, n-amylisobutyl ether, n-amylethyl ether, n-butyl-n-propyl ether, n-butylisoamyl ether, n-ethyl-n-hexyl ether, n-propyl-n-hexylether, n-butyl-n-octyl ether, n-hexyl-n-octyl ether; dialkenyl ethers such as bis (1-butenyl) ether, bis(1-octenyl) ether, bis(1-decynyl)ether, (1-octenyl-9-decynyl) ether; diaralkyl ethers such as bis benzyl ether; diakaryl ethers such as bis(tolyl)ether, bis(xylyl)ether, bis(ethylphenyl)ether, tylylxylyl ether; alkylalkenyl ethers such as propyl-1-butenyl ether, n-octyl-1-decynyl ether, n-decyl-1-decynyl ether; alkylalkaryl ethers such as n-octyl-benzyl ether, n-decyl-benzyl ether; alkylaryl ethers or alkylararyl ethers such as n-octylphenyl ether, n-octyl-tolyl ether, n-decyl-tolyl ether; aralkylalkenyl ethers such as 1-octenyl-benzyl ether; arylalkenyl ethers or alkarylalkenyl ethers such as 1-octenyl-phenyl ether, 1-octenyl-tolyl ether; and aralkylaryl ethers or aralkylararyl ethers such as benzylphenyl ether, benzyltolyl ether, preferably, ethers represented by the aforementioned formula (1) wherein $R^1$ and $R^2$ individually represent a linear hydrocarbon radical such as alkyl or alkenyl group.

Hydrocarbon solvents used as occasion demands, include hydrocarbon solvents having 60 or less, preferably 4–30 carbon atoms so long as they can be suitably used in the methods of type (A). The hydrocarbon solvents are usually selected in accordance with the type of ether used.

Examples of such hydrocarbon solvents include saturated aliphatic hydrocarbons such as n-pentane, n-hexane, n-heptane, n-octane, n-dodecane and liquid paraffins. Alicylic hydrocarbon compounds such as cyclohexane and methyl cyclohexane and aromatic hydrocarbon compounds such as benzene, toluene, xylene, 1, 2, 4-trimethyl benzene and ethyl benzene may also be used. For example, when ethers represented by the aforementioned formula (1) wherein at least one of $R^1$ and $R^2$ is an alkyl group or alkenyl group having five or less carbon atoms are used, aromatic hydrocarbon compounds as mentioned above are preferably used as the hydrocarbon solvent. In this case, however, alicyclic hydrocarbon compounds as mentioned above may also be used as the hydrocarbon solvent. Moreover, when ethers represented by the aforementioned formula (1) wherein $R^1$ and $R^2$ individually are an alkyl group or alkenyl group having six or more, for example 6-30 carbon atoms, are used saturated aliphatic hydrocarbons as mentioned above are preferably used as the hydrocarbon solvent.

Organoaluminum compounds used in the reducing treatment of the aforesaid method (A) are represented by the generic formula;

$$AlR^3_nX_{3-n} \qquad (2)$$

wherein, $R^3$ denotes a hydrocarbon group having from 1 to 20 carbon atoms, preferably an alkyl group having 1-10 carbon atoms, $n$ denotes a number having a value of from 1 to 3 and X denotes a halogen atom. Specifically, these compounds preferably include ethylaluminum sesquichloride, diethylaluminum chloride, trialkylaluminum and the like.

The amount of the organoaluminum compound used in the aforementioned treatment for the reduction of titanium tetrachloride is such that the ratio of titanium tetrachloride to organoaluminum compound falls in the range of from 1 : 0.1 to 1 : 50, preferably from 1 : 0.3 to 1: 10, in terms of the molar ratio of titanium to the residue R (a hydrocarbon group, preferably an alkyl group) in the organoaluminum compound of the generic formula (2).

The amount of ether to be used is such that the molar ratio of ether to titanium tetrachloride falls in the range of from 1 : 0.05 to 1 : 5, preferably from 1 : 0.25 to 1 : 2.5.

In this connection, as the ratio of tetratitanium chloride to ether increases, the polymerization activity of catalyst obtained according to present invention tends downward and further, the yield of the product catalyst (based on the tetratitanium chloride used) becomes lower. On the other hand, as the ratio of ether to tetratitanium chloride used increases, the required amount of liberating agent and/or organoaluminum compound becomes larger and as a result, the yield of the catalyst product (based on the liberating agent and/or organoaluminum compound ) becomes lower.

The reducing treatment can be conducted by various methods including:

(a) A method whereby an organoaluminum compound is added to a homogeneous liquid consisting of titanium tetrachloride and an ether or by addition in a reversed order.

(b) A method whereby a homogeneous liquid consisting of an organoaluminum compound and an ether is added to titanium tetrachloride or by addition in a reversed order.

(c) A method whereby a homogeneous liquid consisting of an organoaluminum compound and an ether is added to a homogeneous liquid consisting of titanium tetrachloride and an ether or by addition in a reversed order.

(d) A method whereby titanium tetrachloride, an ether and an organoaluminum compound are mixed in any desired order at a temperature incapable of inducing a reducing reaction, i.e. a temperature not more than $-30°$ C, and the resultant mixture is then heated to a temperature specified for the reduction.

The titanium tetrachloride, ether and organoaluminum compound which are used in these methods may be in their respective purified form or they may be used in a forms diluted suitably with hydrocarbon solvents. Preferably, the organoaluminum compound is used diluted with a hydrocarbon solvent.

In this connection, it should be noted that it is necessary to carry out the afforementioned reducing treatment in the presence of a suitable hydrocarbon solvent where a specific ether is used.

The liquefied titanium trichloride obtained by subjecting titanium tetrachloride to reduction with the organoaluminum compound in the presence of an ether as described above is a homogeneous solution or mixture comprising titanium trichloride and ether and is soluble in hydrocarbon solvents. It is brown to greenish brown.

The method (A) also embraces a modification in which iodine or an iodine compound is used in the preparation of a liquefied titanium trichloride soluble in hydrocarbon solvents by the aforementioned reduction of titanium tetrachloride. This modified embodiment of the present invention adds iodine or an iodine compound in conjunction with an ether in the reaction system during the reduction of titanium tetrachloride. When the solubilized liquefied titanium trichloride is prepared in the presence of iodine or an iodine compound and an ether, the finely granulated solid titanium trichloride the enjoys further improved efficiency as a catalyst. To be specific, the polymer of an α-olefin produced using this titanium trichloride as the catalyst is notably improved in bulk density as well as stereospecificity. The iodine or iodine compound to be used in this case is preferably added to the system generally before the titanium tetrachloride is reduced. Even after the reduction reaction has started, however, it may be added at any time before the reduction reaction has substantially been terminated.

It should be noted that the aforementioned desired effect of the modified embodiment is not attained if the addition of iodine or an iodine compound is made after the reduction reaction of titanium tetrachloride has terminated.

When the reduction reaction is carried out at −30° C by using diethyl aluminum chloride as the organoaluminum-compound catalyst, for example, the time for the addition of iodine or an iodine compound to the reaction system is prior to the start of reduction reaction, during the reduction reaction or within one hour, preferably one half hour, after the start of reduction reaction.

The iodine or iodine compound used for this purpose may be in a pure form or in a form diluted or dissolved with a hydrocarbon solvent.

The iodine compounds which are suitable for use in the present invention include both organic and inorganic iodine compounds, although organic iodine compounds are preferred to inorganic ones. Examples of organic iodine compounds which are usable are aliphatic iodine compounds such as methyl iodide, ethyl iodide and iodoform, alicyclic iodine compounds such as iodated cyclohexane ($C_6H_{11}I$) and iodated methyl cyclohexane [$C_6H_{10}I(CH_3)$] and aromatic iodine compounds such as iodated benzene ($C_6H_5I$) and iodated toluene [$C_6H_4I(CH_3)$]. Aliphatic iodine compounds are preferably used. Also organic iodine compounds of metals belonging to Groups I through III of the Periodic Table such as, for example, diethyl aluminum monoiodide ($C_2H_5AlI$) are usable. Examples of inorganic iodine compounds which are usable are iodine compounds of metals belonging to Groups I through III of the Periodic Table such as sodium iodide, potassium iodide, magnesium iodide, zinc iodide and aluminum iodide.

The amount in which iodine or an iodine compound is used is such that the molar ratio of iodine or iodine compound to titanium tetrachloride falls in the range of from $1 : 10^4$ to $1 : 5$, preferably from $1 : 20$ to $1 : 10$.

The method of procedure (B) in which solid titanium trichloride is treated with an ether, and if necessary, in the presence of a suitable hydrocarbon solvent, is as follows:

Solid titanium trichloride which may be used as the starting material is, for example, solid titanium trichloride obtained by reducing titanium tetrachloride with hydrogen gas, aluminum or an organometallic compound of aluminum; that obtained by pulverizing the thus produced solid titanium trichloride in a ball mill, or that obtained by subjecting such solid titanium trichloride to a heat treatment; and that obtained by refining the thus obtained product to remove impurities.

Ethers used in the method (B) include the same ethers mentioned above in connection with the method (A). Moreover, hydrocarbon solvents to be used in the method (B) also include the same hydrocarbon solvents as mentioned in connection with method (A).

The amount of ethers to be used in the method (B) is such that the molar ratio of ether to titanium trichloride be more than 1, preferably within the range of 1 to 5, more preferably 1 to 2.

The treatment of solid titanium trichloride with an ether may be effected merely by mixing. This treatment may be also carried out in the presence of a hydrocarbon solvent, as already described in connection with method (A), where specific ethers are used. The liquefied titanium trichloride obtained by the method (B) is the same as that of the method (A).

By means of both methods (A) and (B) described above, a liquefied titanium trichloride soluble in hydrocarbon solvents is advantageously obtained. It has previously been known that solid titanium trichloride forms stable solutions such as, for example, an acidic aqueous solution, an alcohol solution and a tetrahydrofuran solution. A solution of solid titanium trichloride in a hydrocarbon solvent, however, has not previously been known. Furthermore in the present invention, a finely granulated titanium trichloride having excellent olefinic polymerization activity is, precipitated from the liquefied, hydrocarbon soluble titanium trichloride prepared as described above.

The manner in which the finely granulated titanium trichloride having olefinic polymerization activity is precipitated from the liquefied titanium trichloride will now be described.

In the method of the present invention, the solid titanium trichloride is precipitated by contacting a liberating agent with the liquefied titanium trichloride or a solution thereof in hydrocarbon solvents at temperatures from 20° C to 150° C, more preferably 40° to 120° C. In this case, in order to facilitate the precipitation, the amount of the aforementioned hydrocarbon solvent is preferred to be not less than twice the amount by weight of the ether.

The term "liberating agent" as used herein means a chemical substance capable of reacting with the titanium trichloride and ether mixture to precipitate solid titanium trichloride in a free form.

The liberating agents which are suitable for use in the present invention, therefore, include Lewis acids having higher acidity than titanium chloride for example, aluminum compounds represented by the generic formula;

$$AlR^4{}_{n'}X_{3-n'} \qquad (3)$$

(wherein, $R^4$ denotes an alkyl group of 1 to 8 carbon atoms, $n'$ is 0, 1, 1.5 or 2 and X denotes a halogen atom), such as titanium tetrachloride, boron trifluoride, boron trichloride, antimony pentachloride, gallium trichloride, anhydrous ferric chloride, tellurium dichloride, stannic chloride, vanadium tetrachloride, thallium pentachloride, zirconium tetrachloride, beryllium dichloride and bromides corresponding thereto and oxyhalide compounds. Of these Lewis acids, titanium tetrachloride or aluminum compound (3) is preferred, titanium tetrachloride is particulrly preferred.

In the present invention, the liberating agent is employed in the following manner.

Where the liquefied titanium trichloride is obtained in accordance with method (A), the starting material of which is titanium tetrachloride, the combined number of moles of titanium and aluminum present in the liquid is smaller than the number of moles of the ether, then the liberating agent such as, for example, a Lewis acid having a higher acidity than that of the titanium trichloride is preferably added in an amount such that the combined number of moles of titanium (from titanium trichloride), aluminum (from the organometal compound) and the Lewis acid will at least exceed the number of moles of ether. The amount in which the Lewis acid is added to the system is preferably not more than five times the number of moles of titanium. After the liberating agent is added as described above, the reaction system is heated to temperatures preferably in the range of from 40° C to 120° C, for example, to those in the range of from 60° C to 100° C, and then retained in this temperature range for a certain length of time. By the end of this standing period, the contact reaction is complete. In contrast, where the combined number of moles of titanium and aluminum present in the liquid is equal to or greater than the number of moles of the ether (it is particularly desirable for the amount of titanium to be not more than 2.5 times the number of moles of the ether), it is not necessary to add a Lewis acid of the aforementioned description as the liberating agent. In this case, the reaction system in its unaltered form is heated to temperatures preferably in the range of from 40° C to 120° C, for example to those in the range of from 60° C to 100° C, and then retained in this temperature range for a certain length of time.

In the above case, the organoaluminum compound (2) used for reducing TiCl₄ exists in the form of organoaluminum compound (3) in the reaction system. The organoaluminum compound (3) functions as a liberating agent in the process of the present invention. For example, when $AlEt_2Cl$ is employed as a reducing agent, $AlEtCl_2$ produces in the reaction system and acts as a liberating agent. A portion of raw material titanium tetrachloride may remain unreacted in the reaction system. The unreacted titanium tetrachloride also acts as a liberating agent.

The procedure to be followed where the liquefied titanium trichloride is obtained in accordance with the method (B), the starting material for which is solid titanium trichloride will now be described.

The liberating agent is added to the liquid in an amount such that the molar ratio of the agent to the ether in liquefied titanium trichloride exceeds 0.3 and preferably falls in the range of from 0.5 to 30 and the contact reaction is completed by elevating the temperature to a temperature within the range of preferably from 40° C to 120° C, more preferably from 60° C to 100° C and thereafter maintaining the temperature for a certain period of time.

Thus, in the present invention, the liquefied titanium trichloride is brought into contact with the liberating agent at temperatures of from 20° C to 150° C preferably 40° C–120° C so as to precipitate finely granulated solid titanium trichloride. The liberating agent added to the liquid or the liberating agent (such as, for example, an excess amount of titanium tetrachloride) already existing in the liquid is caused to react with the liquefied titanium trichloride present in the liquid at an elevated temperature and consequently, produce a finely granulated, purple, solid titanium trichloride which separates as a precipitate. The velocity at which this solid titanium trichloride is precipitated can be readily controlled by regulating the variables of the reaction medium such as concentration of titanium trichloride, type and concentration of the ether compound and molar ratio of the two, molar ratio and concentration of the liberating agent, and reaction temperature. Moreover, the bulk density of the formed titanium trichloride precipitate can likewise be controlled by regulating the velocity at which the formed solid titanium trichloride is precipitated. The novel purple titanium trichloride is obtained by separating the precipitated titanium chloride and washing the separated precipitate.

The purple titanium trichloride thus obtained generally has a uniform particle size and a small specific surface area, which is mostly measured by the BET method so as not to be more than 10 m²/g. In the titanium trichloride, product virtually no aluminum compound content is detected. Even in an extreme case, the weight ratio of aluminum to titanium hardly exceeds 5%.

The present invention also embraces a modification in which the precipitation is effected by varying the reaction temperature in a number of steps in the course of which the solid titanium trichloride is salted out from the liquefied titanium trichloride. In this multi-step precipitating method, a preferred procedure comprises allowing a minor portion of the precipitate to occur at relatively low temperatures and subsequently heating the system thereby permitting the major portion of the precipitate to form in the presence of the small amount of finely granulated solid titanium trichloride seed crystals produced at low temperature. The conditions for such stepped precipitation are variable to some extent with the mutual molar ratios of the titanium tetrachloride, ether, organoaluminum compound and liberating agent and the particular of hydrocarbon solvent used. Generally, the liquid is first held at relatively low temperatures in the range of from 20° C to 70° C, preferably from 30° C to 55° C, to cause precipitation of an extremely fine granulated, purple, solid titanium trichloride in an amount corresponding to 1 to 50% by weight, more desirably to 2 to 25% by weight, and preferably to 3 to 20% by weight of the theoretical yield of precipitate and thereafter, the reaction system is heated to temperatures not exceeding 150° C, for example, in the range of from 45° C to 150° C, more desirably from 50° C to 120° C, and preferably from 60° C to 100° C to cause the remaining finely granulated purple solid titanium trichloride to precipitate. Although the precipitation time is variable with the other precipitation conditions, it is generally from 5 to 120 minutes, preferably from 10 to 60 minutes, in the low temperature phase and from 2 to 120 minutes, preferably from 10 to 60 minutes, in the subsequent high temperature step.

The multi-step operation involving different reaction temperatures may be carried out in any manner consistent with the aforementioned precipitation conditions. For example, the precipitation may be effected by changing the reaction temperature in more than two steps. At times, it is permissible to effect the precipitation by changing the precipitation temperature continuously. In this modified embodiment of the present invention, it is essential that the solid titanium trichloride precipitated in the relatively low temperature zone accounts for a prescribed weight percentage of the whole titanium trichloride to be salted out during the entire operation.

The titanium trichloride which is precipitated by the multi-step operation described above has a proper particle diameter of the order of 30 to 55 μ, for example, and the individual granules thereof are, surprisingly, so perfectly round as to deserve to be called true spheres.

The purple catalyst of the solid titanium trichloride obtained by the aforementioned modification of the present invention it is capable of greatly increasing the bulk density of the polymer product and of producing a uniform particle size distribution of the formed polymer and therefore, provides excellent polymer fluidity and high commercial productivity.

One of the features of the present invention is that the catalyst product has a spherical shape and another is that the polymer obtained using the catalyst has a uniform particle size distribution. These features are especially notable in the multi-step embodiment of the present invention.

As previously mentioned, the individual granules of the product have a spherical shape approximating that of a true sphere. Owing to this fact, the particles of the formed polymer assume a shape approximating that of a true sphere. The result is an unusual improvement in the free-flowing of the individual particles of both the catalyst itself and also the polymer product. In contrast, it is a well-known fact that a commercially available titanium trichloride catalyst such as, for example, $TiCl_3$. $Ti_3AlCl_3$ which is finely divided, for example by a ball mill and the polymer formed by use of such catalyst both have the shape of a flat plate. These particles do not always possess a satisfactory free-flowing property.

In another embodiment of the invention, the finely granulated solid titanium trichloride is added to the liquefied titanium trichloride prior to precipitation of the solid titanium trichloride from the liquefied titanium trichloride. In this embodiment, since the finely granulaed solid titanium trichloride is used as seed crystal, it should preferably have as small a particle diameter as possible. For example, a finely granulated solid titanium trichloride having an average particle diameter of not more than 50 μ, particularly in the range of from 0.1 to 15 μ, can be used to advantage.

The type of finely granulated solid titanium trichloride to be used as seed crystal is not particularly limited. The α-, β-, γ- and δ-type titanium trichloride crystals which are known polymerization catalysts for α-olefins and eutectic crystals of titanium trichloride with halides such as, for example, aluminum trichloride are suitable for this purpose. The δ-type crystals of titanium trichloride or the eutectic crystals thereof, among others, are used particularly advantageously.

The δ-type crystals of titanium trichloride and the eutectic crystals thereof can be obtained by various methods. For example, they can be obtained by grinding α-, β- or γ-type crystals of titanium trichloride or eutectic crystals thereof in, for example a ball mill. The solid titanium trichloride which is obtained by precipitation from the liquefied titanium trichloride in accordance with the present invention can be used advantageously in its unaltered form or in a suitably pulverized form to serve as seed crystals in the modification described above.

The amount in which the finely granulated solid titanium trichloride is added as seed crystals may be small in view of the purpose for which it is used. For example, it may be from 0.005% to 50% by weight, more desirably from 0.01 to 25% by weight, preferably from 1 to 20% by weight based on the theoretical yield of solid titanium trichloride to be obtained by precipitation.

In the embodiment in which the finely granulated solid titanium trichloride is used as seed crystals as described above, the purple solid titanium trichloride obtained by precipitation, if employed as a polymerization catalyst for an α-olefin, greatly enhances the bulk density of the polymer product and further uniformizes the particle size distribution of the formed polymer.

In addition, the individual particles of the solid titanium trichloride have a shape substantially approximating that of a true sphere similar to those obtained in the embodiment described previously. Thus, the individual particles of the olefin polymer obtained by using these particles as a catalyst likewise assume a shape approximating a true sphere. Use of such a catalyst, therefore, permits production of a polymer the individual particles which enjoy a highly satisfactory free-flowing property.

According to the method of the present invention, a novel purple, solid titanium trichloride which, as a polymerization catalyst for α-olefins, permits production of a polymer having excellent stereospecificity and high bulk density. The solid titanium trichloride catalyst manufactured by the method of this invention can also be used in conjunction with a co-catalyst for the polymerization of α-olefins. The co-catalyst may be for example, an organoaluminum compound represented by the generic formula;

$$AlR^5{}_nX_{3-n} \qquad (4)$$

(wherein, $R^5$ denotes an alkyl group having 1 to 8 carbon atoms, $n$ is an integer of 1 to 3 and X denotes a halogen atom). For the polymerization of α-olefins by use of the catalyst of this invention, any of the various known polymerization methods such as solution polymerization, vaporphase polymerization may be adopted and slurry polymerization. Various other conventional components may be added to the polymerization system.

The catalyst of the present invention is suitable as a sterospecific polymerization catalyst for propylene copolymer consisting of propylene homopolymer and less than 20 mol.% α-olefin, for example ethylene butene-1, and the like.

The present invention will now be described more specifically with reference to preferred embodiments and comparative examples. Comparative Examples 1 to 26 are shown for purposes of illustrating the results of the present invention more clearly. In particular, the Comparative Examples 19, 22 and 25 are shown in comparison to the respective preceeding Examples, but are included within the scope of the present invention.

In the preferred and comparative examples, the polymerization activity K is expressed in terms of the weight (in g) of polypropylene produced per hour, per kg/cm² of propylene pressure per g of titanium trichloride. The isotactic index I.I. is expressed in terms of the amount (in % by weight) of residue which occurs after 6 hours of extraction with boiling n-heptane in a modified Soxhlet extraction apparatus. In the case of an amorphous polymer, therefore, the isotactic index I.I. is expressed in terms of the yield of crystalline polymer since the amorphous polymer is soluble in boiling n-heptane. The intrinsic viscosity [η] is expressed in terms of the value determined at a concentration of 0.1 g/100 ml in tetralin at 135° C. The bulk density $\rho_B$ is expressed in terms of the value obtained by allowing particles of a given polymer to fall naturally into a measuring cylinder having an inner volume of 100 cc to full capacity, finding the weight of polymer particles held in the cylinder and calculating the weight of polymer per unit volume of 1 cc (JIS K-6721).

The particle diameter is that which was determined by the method of classification using sieves. The particle size distribution curves of for the polypropylene particles were obtained by plotting in the Rosin-Rammler paper (for the details of which, refer to "Chemical Engineering Handbook," pp 361–362, published May 10, 1968 by Maruzen Book Co., Ltd.). In the graph, the particle diameter ($\mu$) given on is the horizontal axis and the cumulative weight of particles having particle diameters exceeding the specified range (R%) is given on the vertical axis.

BRIEF DESCRIPTION OF THE DRAWINGS

The attached drawings are graphs illustrating the technical effects of the present invention. FIG. 3 shows the particle size distributions of the polymer particles obtained by the procedures of polymerization indicated in Example 39 and Comparative Examples 22 and 24, respectively. And FIG. 4 shows the particle size distributions of the polypropylene particles obtained by the procedures of polymerization indicated in Example 43 and Comparative Examples 25 and 26, respectively.

EXAMPLE 1

Figure 1:
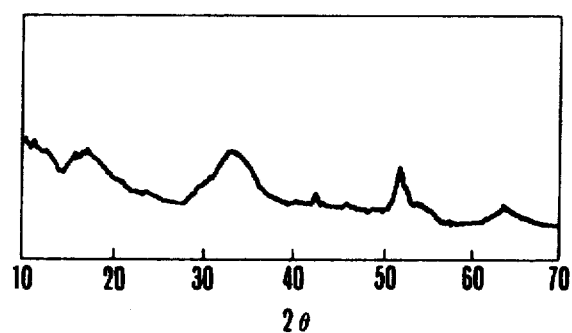
FIG. 1 shows an X-ray diffraction curve obtained with the Cu (K$\alpha$) rays of the titanium trichloride produced in step (B) of Example 7, with the horizontal axis (2 $\theta$) as the scale of values which are twice the angles of diffraction and the vertical axis as the scale of the relative intensity, respectively.

(A) Preparation of the solid titanium trichloride starting material

A thoroughly dried argon-displaced four-neck flask was charged with 50 m.moles of titanium tetrachloride and 28 ml of n-hexane. The flask contents were agitated and simultaneously cooled to 0° C. Then, a solution having 100 m.moles of $(C_2H_5)_3 Al_2Cl_3$ dissolved homogeneously in 34 ml of n-hexane was gradually introduced dropwise over a period of 20 minutes. Thereafter, the flask contents were left to age at the same temperature for 2 hours. The solid titanium trichloride which was consequently precipitated was separated by filtration, washed with 50 ml of n-hexane five times to remove the unaltered titanium tetrachloride and aluminum and finally dried. As a result 11 g of a reddish purple titanium trichloride solid was obtained.

(B) Preparation of liquefied titanium trichloride; homogeneous liquid comprising titanium trichloride and ether To 11 g of the titanium trichloride solid obtained in the step (A) described above was added 75 ml of n-hexane. To the resultant mixture, 100 m.moles of di-n-dodecyl ether was added with simultaneous agitation. When this agitation was continued at the room temperature of 20° C for about 1 hour, there was obtained an n-hexane-soluble dark brown homogeneous liquid of titanium trichloride and dodecyl ether.

(C) Precipitation of titanium trichloride and preparation of catalyst

A 10-m.mole portion was separated from the liquid of titanium trichloride and ether obtained in the step (B) described above. At this point, the concentration of titanium trichloride ether in the homogeneous solution in n-hexane was found to be 1.3 moles/liter n-hexane. When this portion and 20 m.moles of titanium tetrachloride were agitated at 65° C for 3 hours. The result was precipitation of purple titanium trichloride. Then, by separating and washing the precipitate there was obtained 1.5 g of a purple titanium trichloride solid having a very fine particle size.

(D) Polymerization of propylene

By using the purple, finely granulated titanium trichloride catalyst obtained in the step (C) above, propylene was polymerized as described below. A thoroughly dried argon-displaced four-neck flask having an inner volume of 1 liter was charged with 500 ml of n-heptane, 1.4 m.moles of diethyl aluminum chloride as a co-catalyst and 43 mg of the purple, finely granulated titanium trichloride catalyst obtained in step (C) above. The flask contents were heated to 70° C with simultaneous agitation and thereafter, propylene gas was introduced therein under normal pressure polymerization at 70° C for 2 hours. Then, a small amount of isopropyl alcohol was added to stop the polymerization. The flask contents were then introduced into a large volume of methanol, producing 6.4 g of a white powdery polypropylene. The catalyst efficiency (hereinafter referred to as CE) was 149, the polymerization activity (hereinafter referred to as K) was 124, the intrinsic viscosity ($\eta$) of the polymer 2.86 and the isotactic index (hereinafter referred to as I.I.) was 90.7%.

COMPARATIVE EXAMPLE 1

Propylene was polymerized by following the procedure of step (D) of Example 1, except that 3.2 m.moles of diethyl aluminum chloride was used as a co-catalyst and 120 mg of $TiCl_3.2/3AlCl_3$ (Grade AA manufactured by Stauffer Chemical Company) as a catalyst. Consequently, there was obtained 4.6 g of a white powdery polypropylene. Analysis showed CE to be 38, K to be 32, [$\eta$] to be 2.93 and I.I. to be 88.7%.

EXAMPLE 2

From the homogeneous solution of titanium trichloride. di-n-dodecyl ether in n-hexane obtained in step (B) of Example 1, a 10-m.mole portion was separated. This portion was combined with n-hexane as a diluent to prepare a solution, the titanium trichloride.ether concentration of which was 0.3 ml/liter n-hexane. This solution and 50 m.moles of titanium tetrachloride added thereto were agitated at 60° C for 2 hours. From this point on, the procedure of step (C) of Example 1 was followed, with the result that there was obtained 1.4 g of a purple, finely granulated solid titanium trichloride catalyst. By using this catalyst and by faithfully following the procedure of step (D) of Example 1, propylene was polymerized. Analysis showed CE to be 157, K to be 131, [$\eta$] to be 3.02 and I.I. to be 93.9%.

EXAMPLE 3

From the homogeneous liquid of the titanium trichloride. di-n-dodecyl ether in n-hexane obtained in step (B) of Example 1, a 10-m.mole portion was separated. This portion and 30 m.moles of titanium tetrachloride added thereto were agitated at 90° C for 1 hour. From this point on, the procedure of step (C) of Example 1 was followed, with the result that there was obtained 1.25 g of a purple, finely granulated solid titanium trichloride catalyst. By using this catalyst and by faithfully following the procedure of step (D) of Example 1, propylene was polymerized. Analysis showed CE to be 128, K to be 107 and I.I. to be 94.2%.

EXAMPLE 4

A homogeneous liquefied titanium trichloride.ether was obtained by following the procedure of step (B) of Example 1, except that di-n-octyl ether was used in place of di-n-dodecyl ether. From this point on, the procedure of step (C) of Example 1 was faithfully repeated to produce a purple, finely granulated solid titanium trichloride catalyst. By using this catalyst and by faithfully following the procedure of step (D) of Example 1, propylene was polymerized. Analysis showed CE to be 116, K to be 97 and I.I. to be 92.4%.

EXAMPLE 5

From the homogeneous liquid of the liquefied titanium trichloride.di-n-dodecyl ether in n-hexane obtained by step (B) of Example 1, a 10-m.mole portion was separated. This portion was combined with n-hexane as a diluent to produce a solution, the titanium trichloride.ether concentration of which was 0.3 mol/liter n-hexane. This solution and 30 m.moles of ethylaluminum dichloride added thereto were treated by following the procedure of step (C) of Example 1, with the result that there was obtained a purple, finely granulated solid titanium trichloride catalyst. By using 46 mg of this catalyst and also using diethylaluminum chloride as a co-catalyst and repeating the procedure of step (D) of Example 1, propylene was polymerized. Consequently, there was obtained 5.8 g of a white powdery polypropylene.

EXAMPLE 6

A thoroughly dried argon-displaced three-neck 300 mh flask was charged with 20 m.moles of titanium trichloride (Grade AA manufactured by Stauffer Chemical Company) and 10 ml of n-hexane, followed by addition of 40 m.moles of di-n-dodecyl ether. The flask contents were continuously agitated under reflux at the boiling point of n-hexane for 20 hours, with the result that there was obtained a homogeneous titanium trichloride.ether liquid soluble in n-hexane. This liquid and 80 m.moles of titanium tetrachloride added thereto at 60° C were agitated continuously at this temperature for 2 hours. Thereafter, the procedure of step (C) of Example 1 was repeated. Consequently, there was obtained 2.8 g of a purple, finely granulated solid titanium trichloride catalyst. By using this catalyst and by faithfully following the procedure of step (D) of Example 1, propylene was polymerized. Analysis showed K to be 137 and I.I. to be 93.1%.

COMPARATIVE EXAMPLE 2

A thoroughly dried argon-displaced flask having an inner volume of 500 ml was charged with 3 g of titanium trichloride HA available on the market (manufactured by Stauffer Chemical Company) and 300 ml of tetrahydrofuran and the flask contents were agitated and heated under reflux for 24 hours. Consequently, there was formed a system consisting of a blue precipitate composed of titanium trichloride and tetrahydrofuran in a molar ratio of 1 : 3 and a dark bluish brown supernatant. The blue precipitate was found to have an extremely low solubility in tetrahydrofuran. The precipitate was separated from the system and used as a titanium trichloride catalyst. Propylene was polymerized by using as a catalyst the titanium trichloride thus separated and following the procedure of step (D) of Example 1. This treatment, however, gave absolutely no polymer. When the blue precipitate was converted into a slurry by incorporation of n-hexane and this slurry was agitated with titanium tetrachloride of an amount corresponding to ten times as large in number of moles at 50° C for 10 hours, there was obtained a green solid. When propylene was polymerized by using this solid and faithfully following the procedure of step (D) of Example 1, there was obtained absolutely no polymer.

COMPARATIVE EXAMPLE 3

From the solid titanium trichloride obtained in step (A) of Example 1, a 2.2-g portion (equivalent to 10 m.moles of $TiCl_3$) was separated. This portion was combined with 75 ml of n-hexane and while agitated, 20 m.moles of diethyl ether was added thereto. The resultant mixture was heated to 65° C and continuously heated at this temperature for about one hour. At the end of agitation, the solid titanium trichloride changed its color from the initial reddish purple to brown and yet remained as a solid as before. In this case, a titanium trichloride. ether liquid soluble homogeneously in n-hexane similar to the one obtained in step (B) of Example 1 could not be obtained. Thereafter, 20 m.moles of titanium tetrachloride were added and agitation was continued at 65° for 3 hours by following the procedure of step (C) of Example 1. Even at the end of 3 hours of agitation at 650° C, the brown solid remained intact in its original brown color. Brown solid titanium chloride was obtained by separating and washing this solid. When propylene was polymerized by using this solid titanium trichloride and following the procedure of step (D) of Example 1, there was obtained only 0.02 g of a viscous polymer. Analysis showed K to be 9 and I.I. to be 54.2%.

COMPARATIVE EXAMPLE 4

The procedure of Comparative Example 3 was faithfully repeated, except that di-n-ethyl ether was used in place of diethyl ether. Again in this case, the product was unlike the titanium trichloride.ether liquid homogeneously soluble in n-hexane as obtained in step (B) of Example 1. Instead, there was obtained an n-hexane slurry containing brown solid titanium trichloride. Thereafter, 20 m.moles of titanium tetrachloride were added and the system was heated to 65° C by following the procedure of Comparative Example 3. At the end of the treatment, however, the brown solid retained its brown color. When propylene was polymerized by similarly using this solid, there was obtained only 1.17 g of a viscous polymer.

COMPARATIVE EXAMPLE 5

The procedure of Comparative Example 4 was faithfully repeated, except that refined n-dodecane was used in place of n-hexane as a hydrocarbon solvent. Further, the treatment following the addition of titanium tetrachloride was continued at 150° C for 1 hour. There was similarly obtained an n-dodecane slurry containing a brown titanium trichloride solid. When propylene was polymerized in a similar manner using this solid, there was obtained only 0.63 g of a polymer. Analysis showed I.I. to be 64.3%.

COMPARATIVE EXAMPLE 6

When the procedure of Comparative Example 3 was faithfully followed, except that diphenyl ether was used in place of diethyl ether, there was obtained an n-hexane slurry which contained a brown titanium trichloride solid insoluble in n-hexane similar to that obtained by Comparative Example 3. When this slurry with 20 m.moles of titanium tetrachloride added thereto were treated at 65° C for 3 hours, the brown titanium trichloride solid retained in its original brown color at the end of the treatment. Propylene was polymerized likewise by using the solid which had been separated and washed. Consequently, there was obtained only 0.90 g of a viscous polymer. Analysis showed K to be 63 and I.I. to be only 50.7%.

COMPARATIVE EXAMPLE 7

A titanium trichloride.di-n-dodecyl ether liquid homogeneously soluble in n-hexane was obtained by faithfully following the procedure of step (B) of Example 1. Thereafter the procedure of step (C) of Example 1, was followed except that 600 m.moles (30 times as much as in the case of Example 1) of titanium tetrachloride were added to the homogeneous solution in n-hexane, and the system was agitated at 65° C for 3 hours. Consequently, there was obtained a purple solid titanium trichloride catalyst. By using this catalyst and by following the procedure of step (D) of Example 1, propylene was polymerized. The polymerization gave only 0.57 g of a white powdery polypropylene. Analysis showed K to be 11 I.I. to be 94.8%. The data suggest that use of a large excess amount of liberating agent (titanium tetrachloride) enhances I.I. but seriously degrades K.

EXAMPLE 7

(A) Preparation of liquefied titanium trichloride; homogeneous titanium trichloride solution A thoroughly dried argon-displaced four-neck flask having a volume of 500 ml was charged with 125 of n-heptane and 100 m.moles of titanium tetrachloride, followed by addition of 150 m.moles of di-n-dodecyl ether. The flask contents were held at 25° C with continuous agitation, and a solution having 50 m.moles of triethyl aluminum dissolved in 50 m.moles of n-heptane was gradually introduced dropwise. Consequently, there was obtained a greenish dark brown homogeneous solution of titanium trichloride in n-heptane.

(B) Precipitation of titanium trichloride and preparation of catalyst

The homogeneous solution of titanium trichloride obtained in the preceding step of (A) was held at 60° C and 100 m.moles of titanium tetrachloride were gradually added thereto. Immediately, formation of a purple precipitate of titanium trichloride was recognized. The system was held at 60° C for 20 minutes to bring the formation of the precipitate to completion. Then, the precipitate of titanium trichloride was separated by filtration, washed with 100 ml of n-hexane five times, with the result that there was obtained a purple solid titanium trichloride catalyst. The X-ray diffraction curve of this catalyst was as shown in FIG. 1, indicating that it was a highly amorphous δ-type titanium trichloride.

(C) Polymerization of propylene

Propylene was polymerized as described below by using titanium trichloride obtained in step (B) described above. A thoroughly dried argon-displaced four-neck 1 liter flask was charged with 500 ml of n-heptane, 1.4 m.moles of diethyl aluminum chloride and 42.6 mg of the purple titanium trichloride catalyst obtained in step (B) above. The flask contents were heated to 70° C with agitation and thereafter, propylene was introduced at normal pressure for 2 hours for polymerization. Then, a small amount of butanol was added to stop the polymerization. The flask contents were poured into a large volume of methanol and dried. Consequently, there was obtained 7.8 g of a white powdery polypropylene. The catalyst efficiency (CE) was found to be 183, the polymerization activity (K) to be 153, the intrinsic viscosity [η] of the polymer to be 2.64 and the isotactic index (I.I.) to be 95.6%.

(D) Polymerization of propylene by autoclave

In an induced-agitation type autoclave having an inner volume of 3 liters, propylene was subjected to high-catalyst-efficiency polymerization by using the titanium trichloride catalyst obtained in the aforementioned step (B). The autoclave was thoroughly dried, vacuumized and displaced with argon and charged with 10.3 mg of the purple titanium trichloride obtained in the above step (B) and 0.4 ml of a solution of diethyl aluminum chloride in n-hexane (of a concentration of 0.5 m.mole/mol n-hexane). The autoclave was further charged with 800 g of propylene and subsequently with 0.6 kg/cm² of hydrogen gas. The autoclave contents were then heated to 70° C to initate polymerization. When the polymerization terminated, the remaining propylene was released. Consequently, there was obtained 293 g of a white powdery polypropylene. Analysis showed CE to be 28400, K to be 158 and the bulk density of polymer to be 0.39 g/cc.

COMPARATIVE EXAMPLE 8

Figure 2:
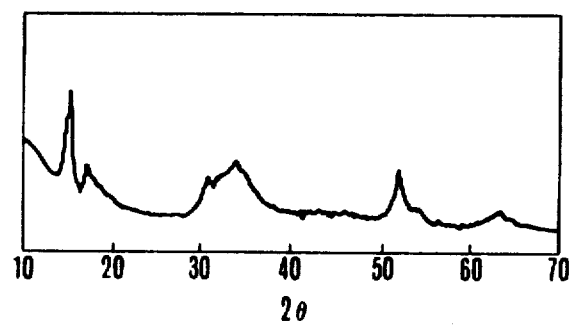
FIG. 2 likewise shows an X-ray diffraction curve obtained, with the titanium trichloride produced in Comparative Example 8.

Propylene was polymerized by faithfully following the procedure of the step of (C) of Example 7, except that titanium trichloride AA(manufactured by Stauffer Chemical Company) for which the X-ray diffraction curve is shown in FIG. 2 was used as the catalyst. Consequently, there was obtained 1.6 g of a white powdery polypropylene. In this case, analysis showed CE to be 38, K to be 32, I.I. to be 88.7% and [η] to be 2.93.

EXAMPLE 8

(A) Preparation of a homogeneous solution of titanium trichloride, (B) preparation of titanium trichloride catalyst and (C) polymerization of propylene were carried out by faithfully following the respective procedures of steps (A), (B) and (C) of Example 7, except that di-n-octyl ether was used in place of di-n-dodecyl ether in step (A) of Example 7. Consequently, there was obtained 8.3 g of a white powdery polypropylene. In this case, I.I. was found to be 94.6%.

EXAMPLE 9

Propylene was polymerized by faithfully following the procedures of steps (A), (B) and (C) of Example 7, except that 100 m.moles of diethyl aluminum chloride was used as the reducing agent in place of 50 m.moles of triethyl aluminum in step (A) of Example 7. Consequently, there was obtained 7.0 g of a white powdery polypropylene. In this case, I.I. was found to be 92.9%.

EXAMPLE 10

Following the procedure of Example 7, a four-neck 500 ml flask was thoroughly dried, displaced with argon and charged with 125 ml of n-heptane and 100 m.moles of titanium tetrachloride. The flask contents with 100 m.moles of di-n-octyl ether added thereto were thoroughly agitated at normal room temperature to form a homogeneous mixture. Then, to the resultant homogeneous mixed solution of titanium tetrachloride, a homogeneous solution of triethyl aluminum obtained by thoroughly mixing 50 m.moles of triethyl aluminum, 50 ml of n-heptane and 50 m.moles of di-n-octyl ether was gradually added to induce reduction. Consequently, there was obtained a greenish brown homogeneous solution of titanium trichloride in n-heptane. By following the procedure of step (B) of Example 7, a purple titanium trichloride catalyst was prepared from the homogeneous solution of titanium trichloride. When propylene was polymerized by using this purple titanium trichloride catalyst and repeating the procedure of step (C) of Example 7, 7.7 g of a white powdery polypropylene was obtained. In this case, I.I. was found to be 94.2%.

EXAMPLE 11

By faithfully following the procedure of step (A) of Example 7, except that n-dodecan was used in place of n-heptane, a greenish dark brown homogeneous solution of titanium trichloride in n-dodecane was obtained. To the solution, 100 m.moles of dichloromonoethyl aluminum were added gradually by following the procedure of step (B) of Example 7, with the result that titanium trichloride precipitated. Thereafter, the precipitate was separated and washed with n-hexane to produce a titanium trichloride catalyst. Propylene was polymerized by using 43.4 mg of this titanium trichloride catalyst and 1.4 m.moles of diethyl aluminum chloride and following the procedure of step (C) of Example 7. Consequently, there was obtained 5.2 g of a white powdery polypropylene.

EXAMPLE 12

To the homogeneous solution of titanium trichloride in n-heptane obtained by faithfully following the procedure of step (A) of Example 7, 50 m.moles of titanium tetrachloride were gradually added and treated at 65° C for 30 minutes to induce precipitation of purple titanium trichloride. Thereafter, the precipitate was separated, washed thoroughly with n-hexane to produce a purple titanium trichloride catalyst. When propylene was polymerized by using this catalyst and following the procedure of step (C) of Example 7, there were obtained 8.1 g of a white powdery polypropylene.

EXAMPLE 13

To the homogeneous solution of titanium trichloride in n-heptne obtained by faithfully following the procedure of step (A) of Example 7, 300 m.moles of titanium trichloride was added gradually and held at 50° C for 60 minutes to induce precipitation of purple titanium trichloride. Thereafter, the precipitate was separated and washed with n-hexane to produce 15.0 g of a purple titanium trichloride catalyst. When propylene was polymerized by using this catalyst and following the procedure of step (C) of Example 7, there were obtained 6.4 g of a white powdery polypropylene. In this case, I.I. was found to be 92.8%.

EXAMPLE 14

A thoroughly dried argo-displaced four-neck 500 ml flask was charged with 150 ml of n-heptane, 50 m.moles of titanium tetrachloride and 125 m. moles of di-n-octyl ether to produce a homogeneous solution. A solution having 25 m.moles of triethyl aluminum contained in n-heptane was then added. The flask contents were then treated by following the procedure of step (A) of Example 7, resulting in a dark brown homogeneous solution of titanium trichloride in n-heptane. Then, this solution of titanium trichloride and 100 m. moles of titanium tetrachloride added thereto was agitated at 80° C for 2 hours. As the temperature rose, there ensued precipitation of a large amount of purple titanium trichloride. This precipitate was separated and washed with n-heptane to produce a purple titanium trichloride catalyst. When propylene was polymerized by using this catalyst and following the procedure of step (C) of Example 7, there was obtained 8.3 g of a white powdery polypropylene. In this case, K was found to be 162 and I.I. to be 93.8%.

COMPARATIVE EXAMPLE 9

The same apparatus as used in Example 7 was charged with 125 ml of n-heptane and 100 m.moles of titanium tetrachloride. Further, 150 m.moles of di-n-propyl ether were added thereto. On addition of the ether, there ensued precipitation of a large amount of product having a strong yello color. When a solution having 50 m.moles of triethyl aluminum contained in n-heptane was gradually added to the slurry containing, in n-heptane, the aforementioned solid precipitate composed of titanium tetrachloride and di-n-propyl ether, the precipitate of a strong yellow color immediately became brown, suggesting that the titanium tetrachloride had been reduced to titanium trichloride. Then, the resultant slurry which contained the brown solid titanium trichloride in n-heptane was combined with 100 m.moles of titanium tetrachloride and allowed to react under reflux at the boiling point of n-heptane (98° C) for 2 hours. At the end of the treatment, however, the titanium trichloride did not become purple but remained in its original brown color. This precipitate was separated and washed to produce a brown titanium trichloride catalyst. When propylene was polymerized using the brown titanium trichloride catalyst by following the procedure of step (C) of Example 7, there was obtained only 0.36 g of a viscous polymer. In this case, K was found to be 7 and I.I. to be 56.2%.

COMPARATIVE EXAMPLE 10

The procedure of Comparative Example 9 was faithfully followed, except that di-n-butyl ether was used in place of di-n-propyl ether. As in Comparative Example 9, titanium tetrachloride and di-n-butyl ether combined to form a precipitate of a yellow solid insoluble in n-heptane. When triethyl aluminum was added to the slurry in n-heptane, there ensued a reduction reaction which produced brown titanium trichloride. In the manner of Comparative Example 9, this slurry was combined with titanium tetrachloride and allowed to react under reflux at the boiling point of n-heptane (98° C) for 2 hours. In spite of the treatment, the titanium trichloride remained in its original brown color and was not converted to purple titanium trichloride. The precipitate was separated and washed to produce a brown titanium trichloride catalyst. When propylene was polymerized by using this brown titanium trichloride catalyst and following the procedure of step (C) of Example 7, there was obtained only 0.43 g of a viscous polymer. In this case, K was found to be 9 and I.I. to be 54.8%.

COMPARATIVE EXAMPLE 11

The procedure of Comparative Example 9 was repeated, except that diphenyl ether was used in place of di-n-propyl ether. In this case, when diphenyl ether was added to the solution of titanium tetrachloride in n-heptane, a dark orange homogeneous solution of titanium tetrachloride, diphenyl ether in n-heptane was produced. When there was subsequently added a solution having 50 m.moles of triethyl aluminum contained in n-heptane, a brown solid titanium trichloride. To the slurry containing the brown solid titanium trichloride precipitate formed in n-heptane, 100 m.moles of titanium tetrachloride were added and allowed to react under reflux at the boiling point (98° C) of n-heptane for 2 hours. In spite of this treatment, the titantium trichloride did not become purple but remained in its original brown color. This precipitate was separated and washed to produce a brown titanium trichloride catalyst. When propylene was polymerized by using this brown titanium trichloride catalyst and following the procedure of step (C) of Example 7, there was obtained only 0.41 g of a viscous polymer.

COMPARATIVE EXAMPLE 12

The homogeneous solution of titanium trichloride in n-heptane obtained by the procedure of step (A) of Example 7 was treated at an elevated temperature of 60° C by following the procedure of step (B) of Example 7 except that titanium tetrachloride was added in 20 times (2 moles) the amount used in step (B). Consequently, there was obtained a purple titanium trichloride catalyst. When propylene was polymerized by using this catalyst and following the procedure of step (C) of Example 7, there was obtained only 0.61 g of a white powdery polypropylene. In this case, K was found to be 13 and I.I. to be 94.6%.

EXAMPLE 15

(A) Preparation of homogeneous solution of titanium trichloride

A thoroughly dried argon-displaced four-neck flask having a 500 ml was charged with 150 ml of n-heptane and 150 m.moles of titanium tetrachloride. 125 m.moles of di-n-decyl ether were then added. With a slight evolution of heat, titanium tetrachloride and di-n-decyl ether reacted with each other and dissolved homogeneously in the n-heptane to produce a homogeneous solution of orange color. Then, this solution was kept at 25° C with continuous agitation and a solution having 25 m.moles of triethyl aluminum dissolved in 50 ml of n-heptane was gradually added. Consequently, there was obtained a slightly greenish brown homogeneous solution of titanium trichloride in n-heptane.

(B) Precipitation of titanium trichloride and preparation of catalyst

The homogeneous solution of titanium trichloride obtained in step (A) above was heated to 70° C. In the course of heating, a precipitate of purple titanium trichloride formed. The system was agitated at 70° C for 40 minutes. Thereafter, the precipitate was separated by filtration, washed with 100 ml of n-hexane five times to produce a purple granulated titanium trichloride catalyst.

(C) Polymerization of propylene

Propylene was polymerized as described below using the novel purple titanium trichloride catalyst obtained in step (B) above. A thoroughly dried argon-displaced four-neck 500 ml flask was charged with 500ml of n-heptane, 1.3 m.moles of diethyl aluminum chloride and 43.1 mg of the purple titanium trichloride catalyst obtained in step (B) above. Then, the system was heated to 70° C with continuous agitation. Thereafter, propylene gas was introduced and polymerized for 2 hours. After that, a small amount of isopropanol was added thereto to stop the polymerization. The flask contents were introduced into a large volume of methanol and dried to produce 8.04 g of a white powdery polypropylene. Analysis showed the catalyst efficiency (CE) to be 187, the polymerization activity (K) to be 155, the intrinsic viscosity of polymer to be 2.73 and the isotactic indec (I.I.) to be 92.8%.

(D) Polymerization of propylene by autoclave

High-catalyst-efficiency polymerization was carried out as indicated below by using an induced-agitation type autoclave having an inner volume of 3 liters. The autoclave was thoroughly dried and displaced with argon and then charged with 12.4 mg of the purple titanium trichloride catalyst obtained in the step of (B) above and 0.45 ml of a solution of diethyl aluminum chloride in n-hexane (of a concentration of 0.5 m.moles/ml of n-hexane). Then, 850 g of propylene and 0.55 kg/cm$^2$ of hydrogen gas were introduced and allowed to polymerized at 70° C. Upon termination of the polymerization, the remaining propylene was released. Consequently, there was obtained 353 g of a white powdery polypropylene. In this case, CE was found to be 28440, K to be 158 and the bulk density of polymer to be 0.36 g/cc.

COMPARATIVE EXAMPLE 13

The procedure of step (A) of Example 15 was faithfully followed, except that di-n-propyl ether was used in place of di-n-decyl ether. When di-n-propyl ether was added to the solution of titanium tetrachloride in n-heptane, there immediately ensued precipitated of a large amount of an n-heptane-insoluble yellowish solid composed of titanium tetrachloride and n-propyl ether. This precipitation was entirely different from the formation of the homogeneous solution of titanium tetrachloride and di-n-decyl ether in n-heptane in step (A) of Example 15. Then, a solution having 25 m.moles of triethyl aluminum dissolved in 50 ml of n-heptane was gradually added to the slurry containing, in n-heptane, the precipitate composed of titanium tetrachloride and di-n-propyl ether. As a result, the yellowish precipitate of titanium tetrachloride turned brown, indicating that the reduction reaction produced titanium trichloride. When the resultant slurry containing a brown solid was heated to the boiling point (98° C) of n-heptane was treated under reflux for 2 hours, the brown solid precipitate did not become purple. Then, the precipitate was separated and washed to produce a brown titanium trichloride catalyst. When propylene was polymerized by using this catalyst and following the procedure of the step of (C) of Example 15, there was obtained only 0.12 g of a viscous polymer. Separately, when the brown titanium trichloride solid was converted into a slurry by addition of 200 ml of refined n-dodecane and the slurry was treated at an elevated temperature of 150° C for 2 hours the solid only changed its color from brown to grayis brown and failed to become purple.

COMPARATIVE EXAMPLE 14

The procedure of Comparative Example 13 was faithfully repeated, except that di-n-butyl ether was used in place of di-n-propyl ether. Consequently, a solid composes of titanium tetrachlorde and di-n-butyl ether in a manner similar to when di-n-propyl ether was used. The slurry of this precipitate in n-heptane was reduced with triethyl aluminum to produce a slurry of a brown solid. When this latter slurry was treated at an elevated temperature of 98° C for 2 hours in much the same way as in Comparative Example 13, there resulted a slurry containing a brown solid precipitate. This precipitate was separated and washed to produce a brown titanium trichloride catalyst. When propylene was polymerized by using this catalyst and following the procedure of step (C) of Example 15, there was obtained only 0.16 g of polymer. In this case, K was found to be 3.

COMPARATIVE EXAMPLE 15

A homogeneous solution of titanium trichloride was prepared by following the procedure of step (A) of Example 15, except that the amount of di-n-decyl ether used was 600 m.moles. In this case, the molar ratio of titanium tetrachloride to di-n-decyl ether was 1 : 4. When the subsequent treatment was performed with added triethyl aluminum, the orange-colored homogeneous solution of titanium tetrachloride and di-n-decyl ether in n-heptane became brown, indicating that the solution was converted into a homogeneous solution of titanium trichloride and di-n-decyl ether in n-heptane. Then, this homogeneous solution of titanium trichloride in n-heptane was treated under reflux at the boiling point (98° C) of n-heptane for 2 hours. In this latter treatment, absolutely no precipitate formed and the homogeneous solution of titanium trichloride in n-heptane remained intact. When polymerization of propylene was attempted by using this homogeneous solution of titanium trichloride, there was obtained absolutely no polymer.

COMPARATIVE EXAMPLE 16

The same apparatus as used in Example 15 was charged with 150 ml of n-heptane, 150 m.moles of titanium tetrachloride and 1.5 m.moles of di-n-decyl ether. When 25 m.moles of triethyl aluminum were subsequently added gradually thereto, a reduction reaction proceeded with vigorous evolution of heat to form a precipitate of a large amount of a brown titanium trichloride solid. Then, the system was heated under reflux at the boiling point (98° C) of n-heptane for 2 hours in the same manner as in Comparative Example 13. At the end of this treatment, the brown precipitate of titanium trichloride remained in its unaltered form. This precipitate was separated and washed to produce a brown titanium trichloride catalyst. When polymerization of propylene was conducted using this catalyst and following the procedure of step (C) of Example 15, there was obtained only 0.39 g of polymer. In this case, K was found to be 8 and I.I. to be 58%. Separately, the brown titanium trichloride solid was converted into a slurry in 150 ml of refined n-dodecane and then treated at an elevated temperature of 150° C for 2 hours. In this treatment, however, hardly any of the solid was observed as being converted into purple titanium trichloride.

COMPARATIVE EXAMPLE 17

A homogeneous solution of titanium trichloride in n-dodecane was obtained by faithfully following the procedure of Example 15 except that n-dodecane was used in place of n-heptane. This solution was treated at 180° C instead of 70° C for 20 minutes to produce a brown titanium trichloride catalyst. When polymerization of propylene was carried out by using the catalyst, follwing the procedure of step (C) of Example 15, only 1.4 g of a white powdery polypropylene was obtained. In this case, K was found to be 28 and I.I. to be 60%.

EXAMPLE 16

A purple titanium trichloride catalyst was obtained by faithfully following the procedure of Example 15 except that di-n-dodecyl ether was used in place of di-n-decyl ether. When propylene was polymerized by using this catalyst and following the procedure of step (C) of Example 15, there was obtained 7.6 g of a white powdery polypropylene. In this case, I.I. was found to be 90.8%.

EXAMPLE 17

A purple titanium trichloride catalyst was obtained by faithfully following the procedure of Example 15 except that di-n-octyl ether was used in place of di-n-decyl ether. When polymerization of propylene was carried out by using this catalyst and following the procedure of step (C) of Example 15, 7.9 g of a white powdery polypropylene was obtained. In this case, I.I. was found to be 93.2% and $[\eta]$ to be 2.64.

EXAMPLE 18

A homogeneous solution of titanium trichloride in n-heptane was obtained by following the procedure of step (A) of Example 15. This solution of titanium trichloride was treated at the boiling point (98° C) of n-heptane for 30 minutes, instead of at 70° C for 40 minutes as in step (B) of Example 15, to produce a purple granulated titanium trichloride catalyst. When propylene was polymerized using this catalyst and following the procedure of step (C) of Example 15, 7.4 g of a white powdery polypropylene was obtained. In this case, K was found to be 148 and I.I. to be 94.3%.

EXAMPLE 19

The same apparatus as used in Example 15 was charged with 150 ml of n-heptane, 150 m.moles of titanium tetrachloride and 150 m.moles of di-n-decyl ether. The flask contents were kept at 25° C with continuous agitation and a solution having 50 m.moles of diethyl aluminum chloride dissolved in 50 ml of n-heptane was gradually added thereto. Thereafter, a purple titanium trichloride catalyst was obtained by folowing the procedure of step (B) of Example 15. When polymerization of propylene was carried out by using this catalyst and following the procedure of step (C) of Example 15, there were obtained 7.0 g of a white powdery propylene. In this case, I.I. was found to be 93.1%.

EXAMPLE 20

The same apparatus as used in Example 15 was charged with 150 ml of n-heptane, 150 m.moles of titanium tetrachloride and 100 m.moles of di-n-decyl ether. The flask contents were continuously agitated and a mixed solution consisting of 25 m.moles of triethyl aluminum, 25 m.moles of di-n-decyl ether and 50 ml of n-heptane was gradually added thereto. Consequently, there was obtained a brown homogeneous solution of titanium trichloride in n-heptane. Then, the homogeneous solution was heated to 80° C and treated by agitation at the elevated temperature for 20 minutes to produce a purple granulated titanium trichloride catalyst. When polymerization of propylene was carried out by using this catalyst and following the procedure of step (C) of Example 15, there were obtained 7.4 g of a white powdery polypropylene. I.I. was found to be 91.8%.

EXAMPLE 21

The same apparatus as used in Example 15 was charged with 130 ml of n-heptane, 125 m.moles of titanium tetrachloride and 100 m.moles of di-n-decyl ether. The flask contents were kept under continued agitation and a mixed solution consisting of 25 m.moles of triethyl aluminum and 50 ml of n-heptane was gradually added to produce a brown homogeneous solution of titanium trichloride in n-heptane. Thereafter, a purple granulated titanium trichloride catalyst was obtained by treating this solution by the procedure of step (B) of Example 15. When polymerization of propylene was carried out by using this catalyst and following the procedure of step (C) of Example 15, 6.4 g of a white powdery polypropylene was obtained. I.I. was found to be 90.4%.

EXAMPLE 22

The same apparatus as used in Example 15 was charged with 140 ml of n-heptane, 175 m.moles of titanium tetrachloride and 150m.moles of di-n-decyl ether. The flask contents were kept continuously agitated and a mixed solution consisting of 25 m.moles of triethyl aluminum and 50 ml n-heptane was gradually added to produce a brown homogeneous solution of titanium trichloride in n-heptane. Thereafter, a purple granulated titanium trichloride catalyst was obtained by treating the solution by the procedure of step (B) of Example 15. When polymerization of propylene was carried out by using this catalyst and following the procedure of step (C) of Example 15, there were obtained 7.6 g of a white powdery polypropylene.

COMPARATIVE EXAMPLE 18

The same apparatus as used in Example 15 was charged with 150 m.moles of n-heptane and 150 m.moles of titanium tetrachloride. Then 125 m.moles of diphenyl ether was added. Upon addition of the diphenyl ether, a dark orange homogeneous solution of titanium tetrachloride in n-heptane immediately formed. When a solution having 25 m.moles of triethyl aluminum in n-heptane was gradually added to the homogeneous solution in the manner of step (A) of Example 15, a brown titanium trichloride solid immediately precipitated. Then, the slurry containing the brown solid precipitate of titanium trichloride was heated to the boiling point of n-heptane and reflexed for two hours. In spite of this treatment, the brown titanium trichloride solid did not become purple but remained in the original brown color. This precipitate was separated and washed to produce a brown titanium trichloride catalyst. When polymerization of propylene was carried out by using this catalyst and following the procedure of step (C) of Example 15, there was obtained only 0.40 g of polypropylene. K was found to be 8 and I.I. to be 52.9%.

EXAMPLE 23

(A) Preparation of homogeneous solution of titanium trichloride

A thoroughly dried argon-displaced four-neck 300 ml neck flask was charged with 75 ml of n-heptane and 5.0 ml of titanium tetrachloride. 13.3 ml of di-n-octyl ether was then added. Then 0.19 g of iodine was added to form a homogeneous solution. The resultant solution was kept at 30° C with continuous agitation and 1.9 ml of diethyl aluminum monochloride was added and the resultant mixture was held at 30° C for about 1 hour. Consequently, there was obtained a blackish brown homogeneous solution of titanium trichloride in n-heptane.

(B) Precipitation of titanium trichloride and preparation of catalyst

The homogeneous solution of titanium trichloride obtained in step (A) above was heated to 90° C. In the course of temperature elevation, formation of a purple precipitate of titanium trichloride was observed. The system was agitated at 90° C for 1 hour. Thereafter, the precipitate was separated by filtration and washed with 100 ml of n-heptane five times to produce 4.1 g of a purple titanium trichloride catalyst. This catalyst was found by the BET method to have a specific surface area of 2 m$^2$/g.

(C) Polymerization of propylene

Polymerization of propylene was carried out as described below using the novel purple titanium trichloride catalyst obtained in step (B) above. A thoroughly dried, argon-displaced four-neck 1 liter flask was charged with 500 ml of n-heptane, 0.45 ml of diethyl aluminum chloride and 66.3 mg of the purple titanium trichloride catalyst obtained as described above. Then, the flask contents were kept at 90° C with continuous agitation and propylene gas was introduced under normal pressure and held at this temperature for two hours for polymerization. The partial pressure of propylene was 0.6Kg/cm$^2$. At the end of 2 hours, the reaction was stopped by addition of ethyl alcohol. The flask contents were introduced into a large volume of methanol, washed, filtered and dried to produce 9.4 g of a white powder. Analysis showed K to be 118, I.I. of polymer to be 96% and [η] to be 2.3 g/dl. $\rho_B$ was found to be 0.30 g/cc.

COMPARATIVE EXAMPLE 19

When the procedures of steps (A) and (B) of Example 23 were repeated without using iodine in step (A) 3.7 g of a purple titanium trichloride solid was obtained. Propylene was polymerized by using 62.8 mg of this purple solid as the catalyst and following the procedure of step (C) of Example 23. The result was 8.7 g of a white powder. K was found to be 115, I.I. of polymer to be 94%, [η] to be 2.2 dl/g and $\rho_B$ to be 0.23 g/cc.

From this example, it is evident that addition of iodine serves to improve I.I. and $\rho_B$.

EXAMPLE 24

A four-neck 300 ml flask was charged with 75 ml of n-heptane, 5.0 ml of titanium tetrachloride and 0.19 g of iodine. The flask contents were kept at 100° C with continuous agitation for 3 hours and thereafter, 13.3 ml of di-n-octyl ether at normal room temperature was added. Then, 1.9 ml of diethyl aluminum chloride was introduced as a reducing agent. From this point on, the procedure of step (B) of Example 23 was faithfully followed. Consequently, there were obtained 4.1 g of a purple titanium trichloride solid. When polymerization of propylene was carried out using 60.3 mg of this solid under the same conditions as those involved in step (C) for Example 23, there were obtained 8.7 g of a white powder. K was found to be 120, I.I. of the polymer to be 96%, [$\eta$] to be 2.3 dl/g and $\rho_B$ to be 0.28 g/cc.

EXAMPLE 25

A reddish brown homogeneous solution of ether complex was prepared by mixing titanium tetrachloride and di-n-octyl ether in n-heptane in relative amounts equalling those involved in step (A) of Example 23. Then, the solution was combined with iodine and subsequently reduced by adding diethyl aluminum chloride. From this point on, the treatment was carried out by following the procedure of step (B) of Example 23. Consequently, there were obtained 4.0 g of a purple titanium trichloride solid. When polymerization of propylene was attempted by using 58.6 mg of this purple solid under the same conditions as those involved in step (C) of Example 23, there were obtained 8.6 g of a white powder. K was found to be 122, I.I. of the polymer to be 96%, [$\eta$] to be 2.3 dl/g and $\rho_B$ to be 0.27 g/cc.

EXAMPLE 26

Titanium tetrachloride and di-n-octyl ether was added at 30° C to n-heptane in relative amounts equalling those involved in step (A) of Example 23. Then, diethyl aluminum chloride was added as a reducing agent. Within 30 minutes of the termination of this reduction treatment, iodine was added to the system. From this point on, the treatment was carried out by following the procedure of step (B) of Example 23. Consequently, there were obtained 5.1 g of a purple titanium trichloride solid. When polymerization of propylene was carried out by using 57.2 mg of the purple solid under the same conditions as those of step (C) of Example 23, there were obtained 7.6 g of a white powder. K was found to be 111, I.I. of the polymer to be 95%, [$\eta$ to be 2.2 dl/g and $\rho_B$ to be 0.31 g/cc.

EXAMPLE 27

The procedures of steps (A) and (B) of Example 23 were faithfully repeated, except that the amount of iodine used in step (A) of Example 23 was charged to 0.51 g. Consequently, 3.5 g of a purple titanium trichloride solid was obtained. When polymerization of propylene was carried out using 28.1 mg of this solid as the catalyst and following the procedure of step (C) of Example 23, there were obtained 3.9 g of a white powder. K was found to be 116, I.I. of the polymer to be 96%, [$\eta$] to be 2.1 dl/g and $\rho_B$ to be 0.28 g/cc.

EXAMPLE 28

When the procedures of steps (A) and (B) of Example 23 were faithfully repeated, except that 0.15 g of potassium iodide was used as the iodine compound in step (A) of Example 23, 4.3 g of a purple titanium trichloride solid was obtained. When propylene was polymerized using 59.3 mg of the solid and by following the procedure of step (C) of Example 23, there were obtained 8.5 g of a white powder. K was found to be 120, I.I. of the polymer to be 95%, [$\eta$] to be 2.2 dl/g and $\rho_B$ to be 0.26 g/cc.

EXAMPLE 29

The procedures of steps (A) and (B) of Example 23 were faithfully repeated, except that 0.20 g of ethyl iodide was used as the iodine compound in step (A) of Example 23. Consequently, 4.0 g of a purple titanium trichloride solid was obtained. When polymerization of propylene was carried out using 53.3 mg of this solid and following the procedure of step (C) of Example 23, 7.6 g of a white powder was obtained. K was found to be 116, I.I. of the polymer to be 95%, [$\eta$] to be 2.1 dl/g and $\rho_B$ to be 0.26 g/cc.

EXAMPLE 30

The procedures of steps (A) and (B) of Example 23 were faithfully repeated, except that 0.50 g of zinc iodide was used as the iodine compound in step (A) of Example 23. Consequently, 4.5 g of a purple titanium trichloride solid was obtained. When propylene was polymerized by using 54.9 mg of the solid and by following the procedure of step (C) of Example 23, 7.4 g of a white powder was obtained. K was found to be 113, I.I. of the polymer to be 95%, [$\eta$] to be 2.3 dl/g and $\rho_B$ to be 0.25 g/cc.

EXAMPLE 31

(A) Preparation of homogeneous solution of titanium trichloride

A thoroughly dried, argon-displaced four-neck 300 ml flask was charged with 2.5 ml of titanium tetrachloride 75 ml of n-heptane and 13.3 ml of di-n-octyl ether. Then 0.20 g of iodine was added and 1.9 ml of diethyl aluminum monochloride was further added. The system was then refluxed at 30° C for 1 hour. Consequently, there was obtained a greenish dark brown homogeneous solution of titanium trichloride in n-heptane.

(B) Precipitation of titanium trichloride and preparation of catalyst

When the homogeneous solution of titanium trichloride obtained in step (A) above was combined with 2.5 ml of titanium tetrachloride and the resultant mixture was heated to 90° C, a purple titanium trichloride precipitate immediately formed. The system was kept at 90° C for 1 hour to bring the reaction producing the precipitate to completion. Then, the precipitate of tatanium trichloride was separated by filtration and washed five times with 100 ml of n-hexane to produce 4.3 g of a purple titanium tetrachloride solid.

(C) Polymerization of propylene

Polymerization of propylene was carried out by using 55.1 mg of the purple solid obtained in step (B) above and by following the procedure of step (C) of Example 23. Consequently, 8.3 g of a white powder was obtained. K was found to be 125, I.I. of the polymer to be 95%, [$\eta$] to be 2.1 dl/g and $\rho_B$ to be 0.26 g/cc.

EXAMPLE 32

(A) Preparation of homogeneous solution of titanium trichloride

A dry argon-displaced four-neck 500 ml flask was charged with 150 ml of refined toluene and 30 m.moles of titanium tetrachloride. Then 90 m.moles of di-n-butyl ether were added with continuous agitation. With a slight evolution of heat, the titanium tetrachloride and ether reacted, then dissolved homogeneously into the toluene to produce an orange homogeneous solution. When the solution was kept at 25° C with continuous agitation and a solution of 30 m.moles of diethyl aluminum chloride dissolved in 200 ml of toluene was gradually added a dark orange homogeneous solution of titanium trichloride was obtained.

(B) Precipitation of titanium trichloride and preparation of catalyst

The homogeneous solution of titanium trichloride obtained in step (A) above and 60 m.moles of titanium tetrachloride were heated to 90° C. In the course of temperature elevation, formation of a purple titanium trichloride precipitate was observed to start. When the system was kept at 90° C with continuous agitation for 30 minutes, formation of a large amount of purple titanium trichloride in the form of fine particles of a uniform diameter was observed. Then, the supernatant was separated and the precipitate was separated by filtration and washed five times with 100 ml of n-hexane to produce a purple, finely granulated titanium trichloride catalyst.

(C) Polymerization of propylene

Polymerization of propylene was carried out as described below by using the novel purple titanium trichloride catalyst obtained in step (B) above. A dried argon-displaced four-neck 1 liter flask was charged with 500 ml of n-heptane, 1.3 m.moles of diethyl aluminum chloride and 40 mg of the purple granulated titanium trichloride obtained in step (B) above. Then, the system was heated to 70° C with continuous agitation and propylene gas was introduced under normal pressure and allowed to undergo polymerization for 2 hours. Thereafter, the polymerization was stopped by addition of a small volume of isopropyl alcohol. The flask contents were introduced into a large volume of methanol, separated and dried to produce 8.7 g of a white powdery polypropylene. The catalyst efficiency (CE) was found to be 218, the polymerization activity (K) to be 181, the intrinsic viscosity of the polymer [$\eta$] to be 253 and the isotactic index (I.I.) to be 92.5%.

EXAMPLE 33

The same apparatus as used in Example 32 was charged with 300 ml of toluene and 60 m.moles of titanium tetrachloride. Further, 150 m.moles of di-n-amyl ether was added thereto. To the resultant homogeneous solution, 30 m.moles of triethyl aluminum were added. By subsequently following the procedure of step (A) of Example 32, there was obtained a dark orange homogeneous solution of titanium trichloride. Subsequently, the solution was combined with 120 m.moles of titanium tetrachloride and the resultant mixture was heated to 90° C with continuous agitation, kept at the elevated temperature for 30 minutes for treatment as in step (B) of Example 32. Consequently, a purple finely granulated titanium trichloride catalyst was obtained. Polymerization of propylene was carried out by usig this catalyst and by following the procedure of step (C) of Example 32. Consequently, there was obtained a white powdery polypropylene. K was found to e 174 and I.I. to be 91.8%.

EXAMPLE 34

The procedure of step (A) of Example 32 was faithfully repeated, except that di-n-propyl ether was used in place of di-n-butyl ether in step (A) of Example 32. Subsequently, a purple, finely granulated titanium trichloride catalyst was obtained by following the procedure of step (B) of Example 32. When polymerization of propylene was carried out using this catalyst and by following the procedure of step (C) of Example 32, there were obtained 8.1 g of a white powdery polypropylene. K was found to be 169 and I.I to be 94.5%.

COMPARATIVE EXAMPLE 20

The procedure of Example 34 was repeated using the same raw materials, except that N-heptane was used in place of toluene. To be more specific, a reactor was charged with 150 ml of n-heptane and 30 m.moles of titanium tetrachloride. Then, 90 m.moles of di-n-propyl ether was gradually added. In the course of this addition of ether, an ether adduct of titanium tetrachloride insoluble in n-heptane precipitated in a large amount. When 30 m.moles of diethyl aluminum chloride were subsequently added, the precipitate was not solubilized. The suspension was combined with 60 m.moles of titanium tetachloride, heated to 90° C and agitated for 30 minutes. Consequently, there was obtained brown titanium trichloride in the form of particles of an inconsistent diameter instead of a purple titanium trichloride solid. Propylene was polymerized by using the particles as the catalyst and by following the procedure of step (C) of Example 32. The results were as follows: K was found to be 31.2, [$\eta$] to be 252 and I.I to be 68.4%.

COMPARATIVE EXAMPLE 21

Titanium trichloride was prepared by faithfully following the procedure of Comparative Example 20, except that cyclohexane was used in place of n-heptane. In the same manner as in Comparative Example 20, a large amount of precipitate was formed before temperature elevation. Even after subsequent treatment at 90° C, no purple titanium trichloride was obtained and only a brown titanium trichloride was produced. When polymerization of propylene was carried out using the precipitate as the catalyst and following the procedure of step (C) of Example 32, there were obtained the following results: CE was found to be 27, K to be 48 and I.I. to be 72.3%.

EXAMPLE 35

(A) Preparation of uniform solution of titanium trichloride

A dried argon-displaced four-neck 500 ml flask was charged with 150 ml of refined toluene and 90 m.moles of titanium tetrachloride. Further, 90 m.moles of di-n-butyl ether was added. With a slight evolution of heat, the titanium tetrachloride and di-n-butyl ether reacted and dissolved homogeneously into the toluene to produce an orange homogeneous solution. This solution was held at 25° C with continuous agitation and a solution of 45 m.moles of diethyl aluminum chloride dissolved in 20 ml of toluene was gradually added. Consequently, there was obtained a dark orange homogeneous solution of titanium trichloride.

(B) Precipitation of titanium trichloride and preparation of catalyst

When the homogeneous solution of titanium trichloride obtained in the step of (A) above was heated to 95° C, formation of a purple titanium trichloride precipitate was observed to start in the course of temperature elevation. After the agitation was continued at 95° C for 45 minutes, the precipitate was separated by filtration and washed five times with 100 ml of n-hexane to produce 126 g of a purple finely granulated titanium trichloride catalyst.

(C) Polymerization of propylene

Polymerization of propylene was carried out by using the purple titanium trichloride catalyst obtained in step (B) above and by following the procedure of step (C) of Example 32. Consequently, 89 g of a white powdery polypropylene was obtained. CE was found to be 223, K to be 185, [η] to be 267 and I.I. to be 93.6%.

EXAMPLE 36

The procedures of steps (A) and (B) of Example 35 were faithfully repeated, except that n-butyl-n-propyl ether was used in place of di-n-butyl ether and xylene was used in place of toluene as the solvent in step (A) of Example 35. Consequently, 12.9 g of a purple finely granulated titanium trichloride catalyst was obtained. Polymerization of propylene was carried out by using this catalyst and by following the procedure of step (C) of Example 35. . There were consequently obtained 8.7 g of a white powdery polypropylene. K was found to be 181 and I.I. to be 92.8%.

EXAMPLE 37

The procedures of steps (A) and (B) of Example 35 were faithfully repeated, except that di-propyl ether was used in place of di-n-butyl ether and trimethyl benzene was used in place of toluene as the solvent in step (A) of Example 35. Consequently, there were obtained 13.1 g a purple, finely granulated titanium trichloride catalyst. Polymerization of propylene was carried out by using this catalyst and by following the procedure of step (C) of Example 35. The product consisted of 8.3 g of a white powdery polypropylene. K was found to be 173 and I.I. to be 94.0%.

EXAMPLE 38

The procedures of steps (A) and (B) of Example 35 were repeated using 150 ml of refined methyl cyclohexane, 90 m. moles of titanium tetrachloride, 90 m.moles of n-butyl-n-octyl ether and 45 m.moles of diethyl aluminum chloride. Consequently, 12.3 g of a purple, finely granulated titanium trichloride was obtained. Polymerization of propylene was carried out by using this catalyst and by following the procedure of step (C) of Example 35. Consequently, 8.5 g of a white powdery polypropylene was obtained. K was found to be 177 and I.I. to be 92.7%.

EXAMPLE 39

(A) Preparation of homogeneous solution of titanium trichloride

A thoroughly dried argon-displaced four-neck 500 ml flask was charged with 150 ml of n-heptane and 90 m.moles of titanium tetrachloride. 90 m.moles of di-n-octyl ether were then added. With a slight evolution of heat, the titanium tetrachloride and di-n-octyl ether reacted with each other and homogeneously dissolved into the n-heptane to produce a clear orange homogeneous solution. Then, the solution was kept at 25° C with continuous agitation and a solution of 30 m.moles of diethyl aluminum monochloride dissolved in 15 ml of n-heptane was gradually added. With a slight evolution of heat, there was obtained a reddish brown homogeneous solution of titanium trichloride in n-heptane.

(B) Precipitation of titanium trichloride and preparation of catalyst

The homogeneous solution of titanium trichloride obtained in step (A) above was heated to 50° C with continuous agitation. At the elevated temperature, formation of a very small amount of a purple, finely granulated titanium trichloride precipitate was observed to occur. When the system was kept at 50° C with continuous agitation for 30 minutes, the final amount of purple titanium trichloride precipitate was about 15% of the theoretical value. Thereafter, the system was heated to 93° C and held at this temperature with continuous agitation for 30 minutes. The precipitate was separated and washed five times with 100 ml of n-heptane to produce 9.8 g of a purple finely granulated titanium trichloride catalyst in the form of spheres of uniform size.

(C) Polymerization of propylene by use of flask

Polymerization of propylene was carried out in a flask by using the purple granulated titanium trichloride obtained in step (B) above. To be more specific, a thoroughly dried argon-displaced four-neck 1 liter flask was charged with 500 ml of n-heptane, 1.6 m.moles of diethyl aluminum monochloride and 40.8 mg of the purple titanium trichloride catalyst obtained in step (B) above. Then, the system was kept at 70° C with continuous agitation and propylene gas was introduced under normal pressure and allowed to polymerize for two hours. Then, polymerization was stopped by addition of a small amount of isopropanol. The flask contents were poured into a large volume of methanol and dried to produce 7.6 g of a white powdery polypropylene. K was found to be 155, CE to be 186, I.I. of the polymer to be 94.3%, to be 2.72 and $\rho_B$ to be 0.273 g/cc. The polymer was in the form of globules approximating true spheres and the particle size distribution was in a very small range.

(D) Polymerization of propylene by use of an autoclave

Polymerization with high catalyst efficiency was obtained by use of an induced-agitation type autoclave having an inner volume of 2 liters. To be more specific, a thoroughly dried argon-displaced autoclave was charged with 38.2 mg of the purple titanium trichloride catalyst obtained in step (B) above and 1.2 m.moles of diethyl aluminum monochloride under argon seal. Then, hydrogen gas was sealed in to a gauge pressure of 0.85 kg/cm². Thereafter, 500 g of liquefied propylene was introduced and allowed to polymerize at 70° C for 1 hour. At the end of 1 hours, the remaining unaltered propylene was purged out and the system was cooled. Consequently, 175 g of a white powdery polypropylene was obtained. In this case, analysis showed CE to be 4580, K to be 153. [η] of polymer to be 1.63, I.I. to be 92.7% and $\rho_B$ to be 0.376 g/cc. The individual particles of this polymer were substantially perfect spheres and the particle size distribution was in an extremely narrow range as illustrated in FIG. 3. The polymer enjoyed an excellent free-flowing property.

COMPARATIVE EXAMPLE 22

The same homogeneous solution as prepared by the procedure of step (A) of Example 39 was treated by following the procedure of step (B) of Example 39, except that the solution was heated rapidly to 93° C and kept at the temperature for 1 hour to produce a purple granulated titanium trichloride catalyst. Polymerization of propylene was carried out by using this catalyst and by following the procedures of steps (C) and (D), respectively. Consequently, the following results were obtained.

Results of the procedure of step (C) (polymerization in a flask)

The yield of a white powdery polypropylene was 7.8 g. CE was found to be 191, K to be 159, I.I. of the polymer to be 93.7% and [η] to be 2.65. The value of $\rho_B$ was found to be 0.197 g/cc, which is noted to be a considerably smaller value than that obtained in step (C) of Example 39.

Results of the procedure of step (D) (polymerization by use of an autoclave)

The yield of a white powdery polypropylene was 185 g. CE was found to be 4840, K to be 161, [η] of the polymer to be 1.73 and I.I. to be 91.9%. The value of $\rho_B$ was found to be 0.319 g/cc, which is noted to be a considerably smaller value than that obtained in step (D) of Example 39.

Moreover, the particle size distribution was in a wider range than that in step (D) of Example 39 as shown in FIG. 3. The free-flowing property of the individual particles was not so satisfactory as that of the product of Example 39.

COMPARATIVE EXAMPLE 23

Polymerization of propylene was carried out by following the procedure of step (C) of Example 39, except that 203.6 mg of a commercially available titanium trichloride (TAC-141 manufactured by Toho Titanium Company) was used so that the molar ratio of diethyl aluminum monochloride to titanium trichloride became 5.5 in step (C). Consequently, 8.0 g of a white powdery polypropylene was obtained. CE ws found to be 39, K to be 32.7, I.I. of the polymer to be 89.7%, [η] to be 2.76 and $\rho_B$ to be 0.206 g/cc. The individual particles of the polymer were flat and the free-flowing property was inferior to that of the product of Comparative Example 22.

COMPARATIVE EXAMPLE 24

Polymerization of propylene was effected by following the procedure of step (D) of Example 39, except that 114.5 mg of commercially available titanium trichloride (TAC-141 made by Toho Titanium Company) and 2.9 m.moles of diethyl aluminum monochloride were used in step (D). There were consequently obtained 118 g of a white powdery polypropylene. CE was found to be 1,030, K to be 34, [η] of the polymer to be 1.65, I.I. to be 86.8% and $\rho_B$ to be 0.277 g/cc. The individual particles of the polymer were flat and the particle size distribution was in a notably wider range as shown in FIG. 3 than that of the product obtained in step (D) of Example 39. Moreover, the free-flowing property of the particles was quite inferior.

EXAMPLE 40

The same homogeneous solution obtained by following the procedure of step (A) of Example 39 was heated to 45° C with continainuous agitation and then maintained at this temperature for 15 minutes to induce precipitation of an amount of a purple, finely granulated titanium trichloride corresponding to about 7% of the final total amount of precipitate. Subsequently, the system was treated by following the procedure of step (B) of Example 39, except that the flask contents were heated to 90° C and kept at this temperature with continuous agitation for one hour. There were consequently obtained 9.4 g of a purple granulated titanium trichloride. Propylene was subsequently polymerized by using the granulated titanium trichloride as the catalyst and following the procedures of steps (C) and (D), respectively. The results were as follows.

Results of the procedure of step (C)

The yield was 7.4 g of a white powdery polypropylene in the form of globules approximating true spheres. CE was found to be 181, K to be 151, I.I. of the polymer to be 94.1% and $\rho_B$ to be 0.263 g/cc.

Results of the procedure of step (D)

The yield was 198 g of a white powdery polypropylene. CE was found to be 5190, K to be 173, [η] of the polymer to be 1.71, I.I. to be 93.1 and $\rho_B$ to be 0.417 g/cc. The individual particles of this polypropylene were virtually spherical and satisfactorily free-flowing.

EXAMPLE 41

The procedure of step (A) of Example 39 was repeated, except that toluene was used in place of n-heptane, di-n-butyl ether was used in place of di-n-octyl ether and 45 m.moles of diethyl aluminum monochloride was used in step (A). Consequently, a homogeneous solution of titanium trichloride in toluene was obtained. Then, the treatment was continued by following the procedure of step (B) of Example 39. There was consequently obtained a purple, finely granulated titanium trichloride catalyst similar to that in Example 39. Polymerization of propylene was carried out by using this catalyst and by following the procedure of step (D) of Example 39. There were consequently obtained 193 g of a white powdery polypropylene. CE was found to be 5050, K to be 168 and $\rho_B$ of the polymer to be 0.363 g/cc. The individual particles of this polymer were substantially perfect spheres and the particle size distribution was in a very narrow range. The free-flowing property of the particles was excellent.

EXAMPLE 42

A homogeneous solution of titanium trichloride in toluene was obtained by following the procedure of Example 41 instead of that of step (A) of Example 39. When this solution was heated to 40° C with continuous agitation and thereafter kept at the elevated temperature for 60 minutes, a precipitate formed in an amount corresponding to about 23% of the theoretical total amount of precipitate. Then, the system was heated to 90° C and kept at the elevated temperature for 60 minutes as in step (B) of Example 39 and 13.4 g of a purple, finely granulated titanium trichloride was obtained. When polymerization was carried out by following the procedure of step (D) of Example 39, 190 g of a white powdery polypropylene was obtained. CE was found to be 4970, K to be 166, [η] of the polymer to be 1.56, I.I. to be 94.2% and $\rho_B$ to be 0.365 g/cc. The individual particles of the polymer were substantially complete spheres and the particle size distribution was in a very small range and the free-flowing property was quite satisfactory.

REFERENTIAL EXAMPLE (METHOD FOR PREPARATION OF δ- TYPE TITANIUM TRICHLORIDE)

(A) Preparation of homogeneous solution of titanium trichloride

A thoroughly dried, argon-displaced four-neck 500 ml flask charged with 150 ml of n-heptane and 90 m.moles of titanium tetrachloride. 90 m.moles of di-n-octyl ether were then added. With a slight evolution of heat, the titanium tetrachloride and di-n-octyl ether reacted and homogeneously dissolved into the n-heptane to a clear orange homogeneous solution. Then, the solution was kept at 25° C with continuous agitation and a solution having 30 m.moles of diethyl aluminum monochloride dissolved in 15 ml of n-heptane was gradually added. With a slight evolution of heat, the reaction proceeded to produce a reddish brown homogeneous solution of titanium trichloride in n-heptane.

(B) Preparation of solid δ-type titanium trichloride

The homogeneous solution of titanium trichloride obtained in step (A) above was heated to 90° C with continuous agitation and then kept at the elevated temperature with continuous agitation for 10 minutes to produce a solid titanium trichloride. The suspension was cooled and the liquid phase was separated. The precipitate was washed with n-heptane to produce a purple, finely granulated solid titanium trichloride. This titanium trichloride consisted of δ-type crystals. The average particle diameter of the crystals was photomicro-graphically determined to be about 9 μ.

EXAMPLE 43

(A) Preparation of homogeneous solution of titanium trichloride

This preparation was carried out by following the procedure of step (A) of the Referential Example.

(B) Precipitation of titanium trichloride and preparation of catalyst

To the homogeneous solution of titanium trichloride obtained in step (A) above, 0.68 g of the δ-type titanium trichloride (equivalent to 7.1% of the theoretical total amount of precipitate) was added to serve as seed crystals. Then, the resultant mixture was rapidly heated to 90° C with continuous agitation and subsequently kept at the elevated temperature for 50 minutes. After the system had been cooled, the precipitate was separated and washed five times with 100 ml of n-heptane to produce 10.3 g of a purple, finely granulated solid titanium trichloride catalyst consisting of particles approximating substantially true spheres and having a uniform particle diameter.

(C) Polymerization of propylene by use of an autoclave

Polymerization high catalyst efficiency was effected by use of an induced-agitation type autoclave having an inner volume of 2 liters. To be specific, the autoclave was thoroughly dried, displaced with argon and charged first with a sealed ampoule containing therein 42.0 mg of the purple titanium trichloride catalyst obtained in step (B) above and then with 1.3 m.moles of diethyl aluminum monochloride under seal of argon. Then, hydrogen gas was sealed therein at a gauge pressure of 0.8 kg/cm². Thereafter, 500 g of liquefied propylene was introduced and the entire system was heated to 70° C. Polymerization was initiated by causing the catalyst ampoule to be broken by dint of the force of agitation. At the end of one hour of polymerization, the remaining unaltered propylene was purged off quickly and the system was cooled to produce 188 g of a white powdery polypropylene. In this case, CE was found to be 4470, K to be 149, [η] of the polymer to be 1.58, I.I. to be 93.5% and $\rho_B$ to be 0.367 g/cc. The individual particles of this polymer were substantially perfect spheres and the particles size distribution was in an extremely narrow range as shown in FIG. 4. The free-flowing property of the particles was excellent.

COMPARATIVE EXAMPLE 25

The procedure of steps (A) and (B) of Example 43 was repeated, except that the addition of seed crystals was omitted in step (B) of Example 43, to produce a purple, finely granulated titanium trichloride solid. When polymerization of propylene was carried out using the solid as the catalyst and following the procedure of step (C) of Example 43, 191 g of a white powdery polypropylene was obtained. CE was found to be 4560, K to be 152, [η] of the polymer to be 1.72, I.I. to be 93.7% and $\rho_B$ to be 0.304 g/cc. The particle size distribution of the individual particles of this polymer was in a wider range than that obtained with the method of Example 43 as shown in FIG. 4. Further, the free-flowing property of the particles was not as satisfactory as to of the product of method of Example 43.

COMPARATIVE EXAMPLE 26

Polymerization of propylene was effected by following the procedure of step (C) of Example 43, except that a commercially available titanium trichloride (TAC-141 made by Toho Titanium Company) was used as the catalyst in step (C) of Example 43. Consequently, 45 g of a white powdery polypropylene was obtained. CE was found to be 1080, K to be 36, [η] of the polymer to be 1,67, I.I. to be 86.7% and $\rho_B$ to be 0.263 g/cc. The particle size distribution of the individual particles of this polymer was in a notably wider range than that obtained with the method of the present invention as shown in FIG. 4. The particles were flat and their free-flowing property was inferior to that of the product of Comparative Example 25.

EXAMPLES 44-46

The procedures of steps (A), (B) and (C) of Example 43 were repeated, except that the amount of seed crystals added in step (A) was varied. The results were as shown in Table 1.

Table 1

| | Step (B) | Result of polymerization | | | | |
|---|---|---|---|---|---|---|
| Ex. No. | The amount of* seed crystals added (Wt%) | CE (gpp/g) Cat | K (gpp/g Cat. hr. propy- lene kg/cm² | I.I. (%) | [η] | $\rho_B$ (g/ cc) |
| 44 | 3.6 | 4680 | 156 | 93.1 | 1.75 | 0.352 |
| 45 | 9.8 | 4890 | 163 | 91.8 | 1.58 | 0.383 |
| 46 | 13.6 | 4410 | 147 | 92.6 | 1.72 | 0.371 |

*The value under this heading represents a percentage by weight based on the theoretical total amount of precipitate.)

EXAMPLE 47

The procedures of steps (A) and (B) of Example 43 were repeated, except that a commercially available δ-type titanium trichloride (TAC-191, eutectic crystals of TiCl₃.1/3AlCl₃) classified by screening to a particle size of not more than about 20 82 was added as seed crystals in an amount of about 10% by weight based on the theoretical total amount of precipitate in step (B) of Example 43. The resulting product was a purple, finely granulated titanium trichloride. When polymerization of propylene was carried out using this solid as the catalyst and following the procedure of step (C) of Example 43, 180 g of a white powdery polypropylene was obtained. CE was found to be 4290, K to be 143, [η] of the polymer to be 1.73, I.I. to be 92.8% and $\rho_B$ to be 0.375 g/cc. The individual particles of this polymer were spherical. The particle size distribution of these particles was in a very narrow range and their free-flowing property was excellent.

What is claimed is:

1. A process for the production of solid purple titanium trichloride suitable for use as a catalyst for polymerization of an α-olefin, which comprises:
  forming a homogeneous solution or mixture comprising titanium trichloride by treating titanium tetrachloride with an organoaluminum compound represented by the generic formula, $AlR^3{}_nX_{3-n}$, wherein $R^3$ denotes a hydrocarbon radical of 1 to 20 carbon atoms, $n$ is a number of the value of 1 to 3 and X a halogen atom, in the presence of an ether and a hydrocarbon solvent selected from the group consisting of alicyclic and aromatic hydrocarbon solvents;

said ether having the generic formula, $R^1$—O—$R^2$, wherein $R^1$ and $R^2$ are individually an alkyl or alkenyl group and at least one of $R^1$ and $R^2$ is an alkyl or alkenyl group having five or less carbon atoms;

heating the thus obtained homogeneous solution or mixture in the presence of a Lewis acid at a temperature in the range of 20°–150° C to cause precipitation of a finely granulated purple solid titanium trichloride; and separating the precipitate.

2. The process of claim 1, wherein said organoaluminum compound is dialkyl aluminum halide.

3. The process of claim 1, wherein said ether is dibutylether, said hydrocarbon solvent is toluene, and said organoaluminum compound is diethylaluminum chloride.

4. The process of claim 1, wherein said ether is added in an amount so that the molar ratio of ether to titanium tetrachloride is within the range of 1:0.05 to 1:5.

5. The process of claim 4, wherein said ratio is within the range of 1:0.25 to 1:2.5.

6. The process of claim 1, wherein said organoaluminum compound is used in an amount so that the molar ratio of titanium in the titanium tetrachloride to the residue $R^3$ in organoaluminum compound is within the range of from 1:0.1 to 1:50.

7. The process of claim 6, wherein said ratio of titanium in the titanium tetrachloride to the residue $R^3$ in organoaluminum compound is within the range of from 1:0.3 to 1:10.

* * * * *